(12) United States Patent
Ryu et al.

(10) Patent No.: US 11,570,774 B2
(45) Date of Patent: Jan. 31, 2023

(54) TECHNIQUES FOR CONTROL REDUCTION IN SIDELINK NETWORK

(71) Applicant: QUALCOMM Incorporated, San Diego, CA (US)

(72) Inventors: Jung Ho Ryu, Fort Lee, NJ (US); Junyi Li, Franklin Park, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/236,909

(22) Filed: Apr. 21, 2021

(65) Prior Publication Data

US 2021/0385811 A1 Dec. 9, 2021

Related U.S. Application Data

(60) Provisional application No. 63/034,320, filed on Jun. 3, 2020.

(51) Int. Cl.
*H04W 72/04* (2009.01)
*H04W 92/18* (2009.01)
*H04W 72/02* (2009.01)

(52) U.S. Cl.
CPC ....... *H04W 72/0446* (2013.01); *H04W 72/02* (2013.01); *H04W 72/0406* (2013.01); *H04W 92/18* (2013.01)

(58) Field of Classification Search
CPC ......... H04W 72/0446; H04W 72/0406; H04W 92/18; H04W 72/02
See application file for complete search history.

(56) References Cited

U.S. PATENT DOCUMENTS

2017/0034688 A1* 2/2017 Kim ........................ G01S 5/26
2019/0132709 A1* 5/2019 Graefe ............ G08G 1/096716
(Continued)

FOREIGN PATENT DOCUMENTS

WO WO-2020064806 A2 4/2020

OTHER PUBLICATIONS

Hhi, F., et al., "Analysis and Design of V2X Resource Entities", 3GPP Draft, 3GPP TSG RAN WG1 Meeting AH1901, R1-1900354_V2X_Phylayerdesign, 3rd Generation Partnership-Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019 Jan. 11, 2019 (Jan. 11, 2019), XP051575963, pp. 1-10, Retrieved from the Internet: URL:http://www.3gpp.org/ftp/tsg%5Fran/WG1%5FRL1/TSGR1%5FAH/NR%5FAH%5F1901/Docs/R1%2D1900354%2Ezip [retrieved on Jan. 11, 2019] p. 6, paragraph 4—p. 8.
(Continued)

*Primary Examiner* — Raj Jain
(74) *Attorney, Agent, or Firm* — Holland & Hart LLP

(57) ABSTRACT

Methods, systems, and devices for wireless communications are described. A first user equipment (UE) may transmit, to a second UE, a first request message indicating a request to transmit a first sidelink message in a first slot of a sidelink network, and may transmit the first sidelink message in a first data section of the first slot based on transmitting the first request message. The first UE may monitor a first portion of a control section of a second slot of the sidelink network for request messages or response messages. The first UE may transmit a second request message in a portion of the second control section of the second slot designated for scheduling ongoing transmissions, and may transmit a second sidelink message in at least one portion of the second slot based on transmitting the second request message.

30 Claims, 12 Drawing Sheets

(56) References Cited

U.S. PATENT DOCUMENTS

| | | | |
|---|---|---|---|
| 2019/0373633 A1 | 12/2019 | Abedini et al. | |
| 2020/0137539 A1* | 4/2020 | Brahmi | H04W 4/44 |
| 2020/0396026 A1* | 12/2020 | Chang | H04W 74/04 |
| 2021/0321267 A1* | 10/2021 | Kim | H04W 76/28 |
| 2021/0385811 A1* | 12/2021 | Ryu | H04W 72/0406 |
| 2022/0022204 A1* | 1/2022 | Fehrenbach | H04W 72/1205 |
| 2022/0191789 A1* | 6/2022 | Reial | H04W 48/12 |
| 2022/0312391 A1* | 9/2022 | He | H04L 5/001 |

OTHER PUBLICATIONS

International Search Report and Written Opinion—PCT/US2021/032993—ISA/EPO—dated Oct. 7, 2021.

* cited by examiner

TECHNIQUES FOR CONTROL REDUCTION IN SIDELINK NETWORK

CROSS REFERENCE

The present application for patent claims the benefit of U.S. Provisional Patent Application No. 63/034,320 by RYU et al., entitled "TECHNIQUES FOR CONTROL REDUCTION IN SIDELINK NETWORK," filed Jun. 3, 2020, assigned to the assignee hereof, and expressly incorporated by reference herein.

FIELD OF TECHNOLOGY

The following relates generally to wireless communications and more specifically to techniques for control reduction in sidelink networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support a number of UEs which may be capable of direct communication with each other (e.g., via sidelink communication links). In such systems, transmissions between devices (e.g., between different UEs) may be performed using control sections and data sections of slots within the sidelink communication links.

SUMMARY

The described techniques relate to improved methods, systems, devices, and apparatuses that support techniques for control reduction in sidelink networks. Generally, the described techniques provide for signaling for a flexible control section of a slot of a sidelink network, which may enable more efficient use of resources within a sidelink communication link. In particular, signaling within the sidelink may allow user equipment (UEs) to transmit data (e.g., sidelink messages) within lower-priority portions (e.g., "flexible" portions) of control sections in addition to data sections of slots within the sidelink communication link. For example, a UE which transmitted data (e.g., a sidelink message) in a data section of a first slot of a sidelink communication link may transmit a request message (e.g., request-to-send (RTS)) message in a dedicated control symbol pair of a second slot in order to "claim" use of the data section and a portion of the control section (e.g., the flexible portion) of the second slot. If no higher-priority communications claim the use of the data section of the second slot, the UE may transmit data (e.g., sidelink messages) within the flexible portion of the control section of the second slot as well as the data section of the second slot. In this regard, the flexible portion of the control section may be used for control signaling when no UE transmits within the dedicated symbol pair, and may be used for data signaling when a UE claims use of the flexible portion via signaling within the dedicated symbol pair of the preceding slot.

DETAILED DESCRIPTION

Figure 1:
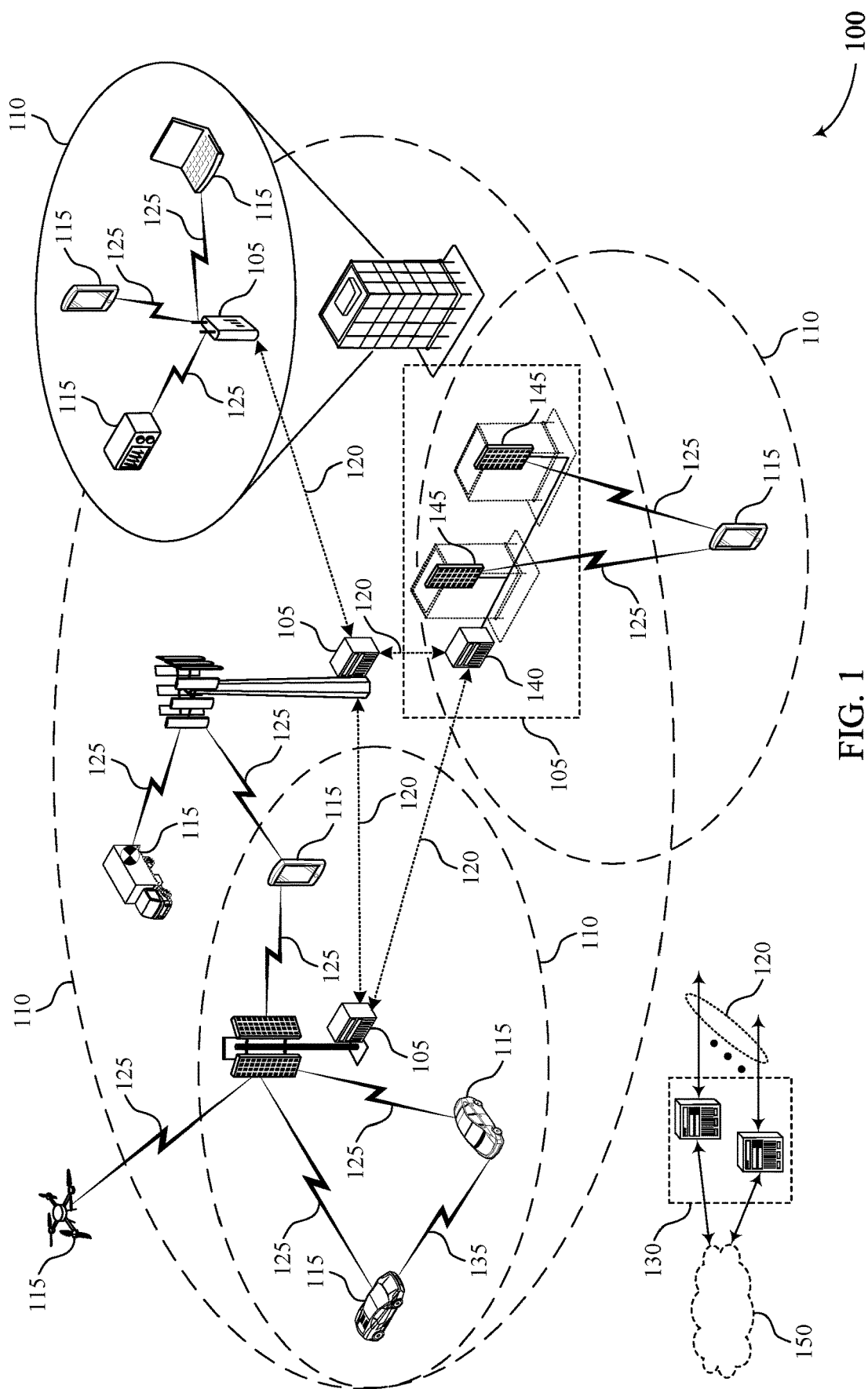
FIG. 1 illustrates an example of a wireless communications system that supports techniques for control reduction in sidelink networks in accordance with aspects of the present disclosure.

Wireless systems may support both access links (e.g., a Uu link) and sidelinks (e.g., a PC5 link) for communications between wireless devices. A "Mode 1" sidelink network may refer to a sidelink network that is managed (e.g., coordinated) by a base station, whereas a "Mode 2" sidelink network may refer to a sidelink network that is not managed (e.g., not coordinated) by a base station. During Mode 2 operation, slots associated with the sidelink network may include a control section including one or more control symbol pairs, and a data section for transmitting sidelink messages. UEs may transmit request-to-send (RTS) messages and receive clear-to-send (CTS) messages within the control symbol pairs of the control section in an attempt to schedule the data section to transmit sidelink messages. Higher priority UEs may transmit RTS and CTS messages towards the beginning of the control section (e.g., within the first control symbol pairs). Lower-priority pairs may monitor for higher-priority RTSs within the control symbol pairs, and may transmit RTS and CTS messages in later control symbol pairs if no higher-priority UE claims use of the data portion. The UE which "wins," or claims, use of the data section may transmit sidelink messages within the data section. In cases where a network includes a large quantity of UEs, the control section of each slot may be long (e.g., large quantity of control symbol pairs). However, in cases where only a few of the UEs are actively trying to use the sidelink, the resources allocated for control signaling within the control section (e.g., within the control symbol pairs) may be wasted, leading to inefficient use of resources within the sidelink.

Accordingly, techniques of the disclosure are directed to signaling for a flexible sidelink control section which may enable more efficient use of resources within a sidelink network. In particular, signaling within the sidelink may allow UEs to transmit data (e.g., sidelink messages) within lower-priority portions (e.g., "flexible" portions) of sidelink control sections in addition to the data sections. In some cases, such techniques may be used when there are relatively few other UEs attempting to use the sidelink network. For example, a UE currently transmitting in a first slot of a sidelink may monitor a control portion of a second slot. If no higher-priority UEs claim the use of the data section of the second slot, the UE may transmit an RTS message in a dedicated control symbol pair of a second slot in order to "claim" use of the data section and a portion of the control section (flexible portion) of the second slot. The UE may then transmit data (e.g., sidelink messages) within the flexible portion of the control section of the second slot as well as the data section of the second slot. In this regard, the flexible portion of the control section may be used for control signaling when no UE transmits within the dedicated symbol pair, and may be used for data signaling when a UE claims use of the flexible portion via signaling within the dedicated symbol pair of the preceding slot.

In some aspects, a base station may semi-statically or dynamically configure the position of the dedicated control symbol pair in order to accommodate higher or lower quantities of UEs that are actively attempting to use the sidelink. Moreover, a base station may be able to enable the "flexible control section" mode of operation within the sidelink when there are few UEs attempting to utilize the sidelink, and may disable the "flexible control section" mode of operation and return to a default mode of operation for the sidelink when there are many UEs attempting to utilize the sidelink. By allowing for a flexible control portion within the control section of a sidelink which may be optionally used for control signaling and/or data signaling, the techniques described herein may provide for more efficient use of resources within the sidelink.

Aspects of the disclosure are initially described in the context of wireless communications systems. Aspects of the disclosure are additionally described in the context of an example sidelink schematic diagram and an example process flow. Aspects of the disclosure are further illustrated by and described with reference to apparatus diagrams, system diagrams, and flowcharts that relate to techniques for sub-band precoding in sidelink communications.

FIG. 1 illustrates an example of a wireless communications system 100 that supports techniques for control reduction in sidelink networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for signaling a flexible control section of a sidelink network which may enable more efficient use of resources within sidelink communication links of the sidelink network. The wireless communications system 100 may enable UEs 115 to transmit data (e.g., sidelink messages) within lower-priority portions (e.g., "flexible" portions) of sidelink control sections, in addition to transmitting data within the data sections. For example, a UE 115 of the wireless communications system 100 which is currently transmitting in a first slot of a sidelink communication link may monitor a portion of a control section of a second slot of the sidelink communication link. If no higher-priority UEs 115 claim the use of the data section of the second slot, the UE 115 may transmit an RTS message in a dedicated portion (e.g., dedicated control symbol pair) of the control section of the second slot in order to "claim" use of the data section and a portion of the control section (flexible portion) of the second slot. The UE 115 may then transmit data (e.g., sidelink messages) within the flexible portion of the control section of the second slot and/or the data section of the second slot. In this regard, the flexible portion of the control section may be used for control signaling when no UE 115 transmits within the dedicated symbol pair, and may be used for data signaling when a UE 115 schedules use of the flexible portion via signaling within the dedicated symbol pair of the preceding slot.

In some aspects, a base station 105 of the wireless communications system 100 may semi-statically or dynamically configure the position of the dedicated portion (e.g., dedicated control symbol pair) in order to accommodate higher or lower quantities of UEs 115 that are actively attempting to use the sidelink. Moreover, a base station 105 may be able to enable the "flexible control section" mode of operation within the sidelink when there are few UEs 115 attempting to utilize the sidelink, and may disable the "flexible control section" mode of operation and return to a default mode of operation for the sidelink when there are many UEs 115 attempting to utilize the sidelink.

Techniques described herein may enable the base stations 105 and the UEs 115 of the wireless communications system 100 to carry out signaling for a flexible control portion within a control section of a sidelink slot, which may be used for control signaling and/or data signaling. Accordingly, the techniques described herein may provide for more efficient use of resources within sidelink communication links of the wireless communications system 100.

Figure 2:
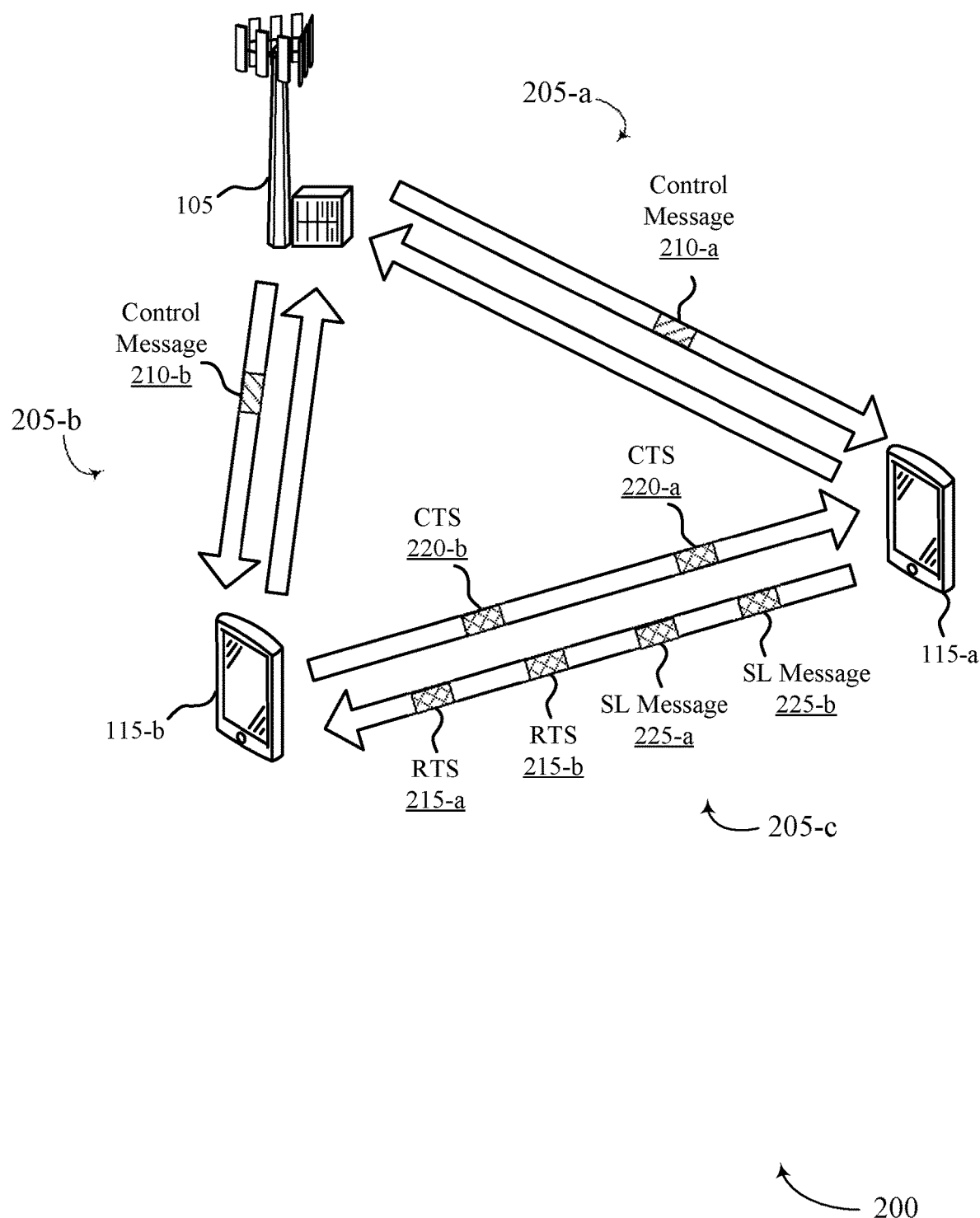
FIG. 2 illustrates an example of a wireless communications system that supports techniques for control reduction in sidelink networks in accordance with aspects of the present disclosure.

FIG. 2 illustrates an example of a wireless communications system 200 that supports techniques for control reduction in sidelink networks in accordance with aspects of the present disclosure. In some examples, wireless communications system 200 may implement aspects of wireless communications system 100. The wireless communications system 200 may include a first UE 115-a, a second UE 115-b, and a base station 105, which may be examples of UEs 115 and base stations 105, as described with reference to FIG. 1. Wireless communications system 200 may support the signaling of flexible portions of a control section of a sidelink which may be used for control signaling and/or data signaling.

The first UE 115-a and the second UE 115-b may communicate with the base station 105 using a communication link 205-a and a communication link 205-b, respectively, which may be examples of NR or LTE links between the first UE 115-a and the second UE 115-b, respectively, and the base station 105. In some cases, the communication link 205-a and the communication link 205-b may include examples of access links (e.g., Uu links). The communication link 205-a and communication link 205-b may include bi-directional links that enable both uplink and downlink communication. For example, the first UE 115-a may transmit uplink signals, such as uplink control signals or uplink data signals, to the base station 105 using the first communication link 205-a and the base station 105 may transmit downlink signals, such as downlink control signals or downlink data signals, to the first UE 115-a using the communication link 205-a. By way of another example, the second UE 115-b may transmit uplink signals, such as uplink control signals or uplink data signals, to the base station 105 using the first communication link 205-b and the base station 105 may transmit downlink signals, such as downlink control signals or downlink data signals, to the second UE 115-b using the communication link 205-b. The first UE 115-a and the second UE 115-b may communicate with one another via a communication link 205-c. In some cases, the communication link 205-c may include an example of a link between two UEs 115 (e.g., a sidelink communication link, or PC5 link).

In some aspects, the communication link 205-c between the first UE 115-a and the second UE 115-b (e.g., sidelink communication link) may be included within a sidelink network of the wireless communications system 200. The sidelink network (e.g., sidelink network including the communication link 205-c) may be configurable to operate in a "Mode 1" and/or a "Mode 2." While operating in Mode 1, the sidelink network (e.g., communication link 205-c, or sidelink communication link) may be managed (e.g., coordinated) by the base station 105. In this regard, during Mode 1 operation, the base station 105 may manage resource allocation over the communication link 205-c. Comparatively, while operating in Mode 2, the sidelink network (e.g., communication link 205-c, or sidelink communication link) may not be managed (e.g., may not be coordinated) by the base station 105. Without coordination or management of the resources of the sidelink network during the Mode 2 operation, the UEs 115 (e.g., first UE 115-a, second UE 115-b) of the wireless communications system 200 may follow contention-based access procedures in which the various UEs 115 may "compete" for the use of the sidelink network, including the communication link 205-c.

In some wireless systems, during a "default" Mode 2 sidelink operation, slots of a sidelink network may include a control section including a set of control symbol pairs, and a data section for transmitting sidelink messages. In such wireless systems, UEs may transmit RTS messages and receive CTS messages within the control symbol pairs of the control section in an attempt to schedule use of the data section to transmit sidelink messages within the data section. Higher priority UEs may transmit RTS and CTS messages towards the beginning of the control section (e.g., within the first control symbol pairs). Lower-priority pairs may monitor for higher-priority RTS and CTS messages within the control symbol pairs, and may transmit RTS and CTS messages in later control symbol pairs if no higher-priority UE claims use of the data portion. The UE which wins or claims use of the data section may transmit sidelink messages within the data section. In cases where a network includes a large quantity of UEs, the control section of each slot may be extremely long (e.g., large quantity of control symbol pairs). However, in cases where only a few of the UEs are actively trying to use the sidelink, the resources allocated for control signaling within the control section (e.g., within the control symbol pairs) may be wasted (e.g., unused), leading to inefficient use of resources within the sidelink.

Accordingly, techniques described herein may support communications which support a "flexible portion" of a control section which may enable more efficient use of resources within a sidelink network (e.g., communication link 205-c) of the wireless communications system 200. In some cases, the first UE 115-a, the second UE 115-b, and the base station 105 of the wireless communications system 200 may support signaling which allows the first UE 115-a and the second UE 115-b to transmit data (e.g., sidelink messages) within lower-priority portions (e.g., "flexible portions") of sidelink control sections of slots within the communication link 205-c in addition to data sections of the slots within the communication link 205-c. In this regard, techniques described herein may enable a "flexible control section" mode of operation (e.g., flexible Mode 2 sidelink operation) where at least a portion of control sections of slots of the sidelink network may flexibly (e.g., optionally) be used for control signaling, data signaling, or both.

Additionally, in some aspects, the base station 105 may be able to enable the "flexible control section" mode of operation within the sidelink network (e.g., communication link 205-c) when there are few UEs 115 attempting to utilize the sidelink, and may disable the "flexible control section" mode of operation and return to a default mode of operation for the sidelink network when there are many UEs 115 attempting to utilize the sidelink. Furthermore, the base station 105 may semi-statically or dynamically configure one or more characteristics of the sidelink network to enable the flexible control section mode of operation.

For example, the base station 105 may transmit control messages 210-a and 210-b to the UEs 115-a and 115-b, where the control messages 210-a and 210-b indicate one or more characteristics of a sidelink network of the wireless communications system 200 (e.g., sidelink network including the communication link 205-c). In some aspects, the control messages 210-a and 210-b may indicate a mode of operation (e.g., Mode 1, Mode 2) associated with the sidelink network. For instance, the sidelink network may be operated under Mode 1, and the base station 105 may transmit the control messages 210-a and 210-b to the UEs 115-a and 115-b indicating a transition to Mode 2 operation. In this example, the control messages 210-a and 210-b may indicate that the sidelink network (e.g., communication link 205-c) is going to be operated according to Mode 2 where the sidelink network is not managed by the base station 105. Conversely, by way of another example, the sidelink network may be operated under Mode 2, and the base station 105 may transmit the control messages 210-a and 210-b to the UEs 115-a and 115-b indicating a transition to Mode 1 operation. In this example, the control messages 210-a and 210-b may indicate that the sidelink network is going to be operated according to Mode 1, where the sidelink network may be coordinated or managed by the base station 105.

During Mode 2 operation of the sidelink network, sidelink communication links (e.g., communication link 205-c) may be operated according to a "default" Mode 2 or a "flexible control section" Mode 2. Under the default mode of operation, control sections of slots of the sidelink communication links may be used only for control signaling (e.g., RTS messages, CTS messages), whereas data sections of the slots of the sidelink communication links may be used for data signaling (e.g., sidelink messages). Comparatively, under the flexible mode of operation, at least some portion of the control sections of slots of the sidelink communication links may be optionally used for control signaling, data signaling, or both. In this regard, while communicating over the communication link 205-c using the flexible mode of operation (e.g., flexible Mode 2), the first UE 115-a and the second UE 115-b may use at least a portion of a control section of slots of the communication link 205-c for control signaling, data signaling, or both.

In some aspects, the base station 105 may initiate a transition from the default mode of operation (e.g., default Mode 2) to the flexible mode of operation (e.g., flexible Mode 1), or vice versa, via the control messages 210-a and 210-b. In this regard, the control messages 210-a and 210-b may indicate a transition from the default mode of operation to the flexible mode of operation, or vice versa. The base station 105 may initiate the transition between the default mode of operation and the flexible mode of operation based on any number of characteristics including, but not limited to, a quantity of UEs 115 attempting to use the sidelink network. For example, the base station 105 may determine that a quantity of UEs 115 which are attempting to use the sidelink network satisfies a given threshold. In some cases, the threshold may be satisfied when the quantity of UEs 115 which are attempting to use the sidelink network is less than or equal to the threshold. In cases where the threshold is satisfied, the base station 105 may indicate a transition from the default mode of operation to the flexible mode of operation based on the quantity of UEs 115 satisfying the threshold. Conversely, the base station 105 may determine that a quantity of UEs 115 attempting to use the sidelink network does not satisfy the threshold (e.g., the quantity of UEs 115 attempting to use the sidelink network is greater than or equal to a given threshold), and may indicate a transition from the flexible mode to the default mode based on the quantity of UEs 115 not satisfying the threshold.

In some aspects, while operating the sidelink network in the flexible Mode 2, the first UE 115-a may transmit a first request message 215-a (e.g., first RTS message 215-a) to the second UE 115-b. The first request message 215-a may be transmitted in a first control section of a first slot of the sidelink network over the communication link 205-c. For example, the first request message 215-a may be transmitted in a first symbol of a control symbol pair for RTS/CTS messages within the first control section of the first slot. Additionally, the first request message 215-a may indicate a request for the first UE 115-a to transmit a first sidelink message 225-a in a first data section of the first slot.

In some aspects, the second UE 115-b may transmit a first response message 220-a (e.g., first CTS message 220-a) to the first UE 115-a based on the first request message 215-a. The first response message 220-a may be transmitted in the first control section of the first slot of the sidelink network over the communication link 205-c. For example, the first response message 220-a may be transmitted in a second symbol of the control symbol pair including the first request message 215-a within the first control section of the first slot. The first response message 220-a may indicate an acknowledgement (e.g., acceptance) for the first UE 115-a to transmit the first sidelink message 225-a in the first data section of the first slot. The first UE 115-a may transmit the first sidelink message 225-a to the second UE 115-b in the first data section of the first slot. In some aspects, the first sidelink message 225-a may be transmitted based on transmitting the first request message 15-a, receiving the first response message 220-a, or both.

In some cases, the first UE 115-a may have additional data which is to be transmitted to the second UE 115-b in addition to the data transmitted in the first sidelink message 225-a in the first slot. Accordingly, the first UE 115-a may attempt to claim at least a portion of a second slot in order to transmit the additional data via a second sidelink message 225-a in the second slot. However, the first UE 115-a may first determine whether any other higher-priority UEs 115 are also attempting to claim use of the second slot. In cases where a higher-priority UE 115 claims use of the second slot, the first UE 115-a may be preempted from transmitting data in the second slot. In other cases where no other higher-priority UE 115 claims use of the second slot, the first UE 115-a may transmit a second request message 215-b (e.g., second RTS message 215-*b*) in a portion of a second control section of the second slot designated for scheduling ongoing transmissions.

In this regard, the first UE 115-*a* may monitor a first portion (e.g., a "high-priority portion") of a control portion of the second slot of the sidelink network for one or more request messages (e.g., RTS messages), one or more response messages (e.g., CTS messages), or both, received from additional UEs 115 of the wireless communications system 200. For example, the first UE 115-*a* may monitor the high-priority portion of the control section of the second slot for one or more RTS or CTS messages received from other high-priority UEs 115. In some aspects, the first portion (e.g., the high-priority portion) of the control section of the second slot may include a first set of control symbol pairs within the control section of the second slot reserved for high-priority UEs 115.

In some aspects, the relative priority of UEs 115 (e.g., high-priority, low-priority) within the wireless communications system 200 may be configured (e.g., pre-configured), semi-statically configured, or dynamically configured by the base station 105. In some aspects, the base station 105 may organize UEs 115 and assign relative priorities to the UEs 115 based on identifiers associated with the UEs 115. In some cases, the base station 105 may regularly or intermittently re-assign priorities to the UEs 115 so that the various UEs 115 may have relatively similar opportunities to claim use of the sidelink network and transmit sidelink messages.

In some cases, the first UE 115-*a* may identify an RTS message, a CTS message, or both, within the first portion (e.g., high-priority portion) of the control section of the second slot based on monitoring the sidelink network. In some cases, the first UE 115-*a* may determine that another UE 115 (e.g., another high-priority UE 115) intends to transmit data within the second slot based on identifying the RTS message, the CTS message, or both, within the first portion (e.g., high-priority portion) of the control section of the second slot. In such cases, the first UE 115-*a* may refrain from transmitting the second request message 215-*b* in the portion of the second control section of the second slot designated for scheduling ongoing transmissions based on identifying the RTS message, the CTS message, or both, within the first portion (e.g., high-priority portion) of the control section of the second slot. In this regard, the first UE 115-*a* may be preempted from transmitting second request message 215-*b*, the second sidelink message 225-*a*, or both, in the second slot based on a higher-priority UE 115 claiming use of the second slot.

In other cases, the first UE 115-*a* may not identify any RTS message or CTS message within the first portion (e.g., high-priority portion) of the control section of the second slot. In this regard, the first UE 115-*a* may identify an absence of RTS or CTS messages within the first portion of the control section of the second slot. In such a case, the first UE 115-*a* may determine that it is free to transmit the second request message 215-*b* in the portion of the second control section of the second slot designated for scheduling ongoing transmissions based on the absence of RTS or CTS messages within the first portion of the control section of the second slot.

In some aspects, the second request message 215-*a* transmitted in the portion of the second control section of the second slot designated for ongoing transmissions may indicate a request to transmit the second sidelink message 225-*a* in at least one portion of the second slot. In some aspects, the second UE 115-*b* may transmit a second response message 220-*b* (e.g., second CTS message 220-*b*) to the second UE 115-*a* based on the second request message 215-*b*. The second response message 220-*b* may be transmitted in the portion of the second control section of the first slot designated for scheduling ongoing transmissions. For example, the second response message 220-*b* may be transmitted in a second symbol of the designated control symbol pair for scheduling ongoing transmissions within the second control section of the second slot. The second response message 220-*b* may indicate an acknowledgement (e.g., acceptance) for the first UE 115-*a* to transmit the second sidelink message 225-*b* in the at least one portion of the second slot of the sidelink network (e.g., communication link 205-*c*).

The first UE 115-*a* may transmit the second sidelink message 225-*b* to the second UE 115-*b* in the at least one portion of the second slot based on transmitting the second request message 215-*b*, receiving the second response message 220-*b*, or both. Additionally, the first UE 115-*a* may transmit the second sidelink message 225-*b* to the second UE 115-*b* in the at least one portion of the second slot based on determining the absence of RTS or CTS messages within the first portion of the control section of the second slot. In some aspects, the at least one portion of the second slot including the second sidelink message 225-*b* may include a portion of the control section of the second slot, the data section of the second slot, or both.

For example, in some cases, the first UE 115-*a* may transmit the second sidelink message 225-*b* in a second portion (e.g., low-priority portion) of the second control section of the second slot. In some cases, the second portion (e.g., low-priority portion) may be positioned within the second control section of the second slot following the first portion (e.g., high-priority portion), the portion designated for scheduling ongoing transmissions, or both. By way of another example, in other cases, the first UE 115-*a* may transmit the second sidelink message 225-*b* in the data section of the second slot. Furthermore, in other cases, the first UE 115-*a* may transmit the second sidelink message 225-*b* in both the second portion (e.g., low-priority portion) of the second control section of the second slot and the second data section of the second slot. For instance, the first UE 115-*a* may transmit a first portion of the second sidelink message 225-*b* in the second portion of the second control section of the second slot, and may transmit a second portion of the second sidelink message 225-*b* in the data section of the second slot.

Additionally, or alternatively, in cases where the first UE 115-*a* identifies an RTS message, a CTS message, or both, within the first portion (e.g., high-priority portion) of the control section of the second slot, the first UE 115-*a* may share the second slot with the high-priority UE 115. For instance, while monitoring the first portion (e.g., high-priority portion) of the control section of the second slot, the first UE 115-*a* may identify an RTS message transmitted by a third UE 115 (e.g., high-priority UE 115) requesting to transmit data within the second slot. In such a case, the first UE 115-*a* may still transmit the second request message 215-*b* in the second slot. The first UE 115-*a* may further identify a first subset of the second slot (e.g., first portion of the data section of the second slot) allocated for data transmission by the third UE 115, and identify a second subset of the second slot (e.g., second portion of the data section of the second slot) allocated for data transmission by the first UE 115-*a*. The first UE 115-*a* may then transmit the second sidelink message 225-*b* in the second subset of the second slot after the data transmission by the third UE 115 within the first subset of the second slot.

By allowing for at least a portion of control sections of slots of the sidelink network to be flexibly used for control signaling (e.g., request messages 215, response messages 220), data signaling (e.g., sidelink messages 225), or both, techniques described herein may provide for more efficient use of resources within the sidelink network of the wireless communications system 200. In particular, when few UEs 115 are attempting to transmit data over the sidelink network, techniques described herein may allow a larger proportion of the slots of the sidelink network to be used for data transmission, as compared to the default mode of operation. In such cases, both the data sections and the flexible portions of the control sections of the slots of the sidelink network may be used for data transmission, thereby reducing the amount of resources which would otherwise go unused and wasted under the default mode of operation.

Figure 3:
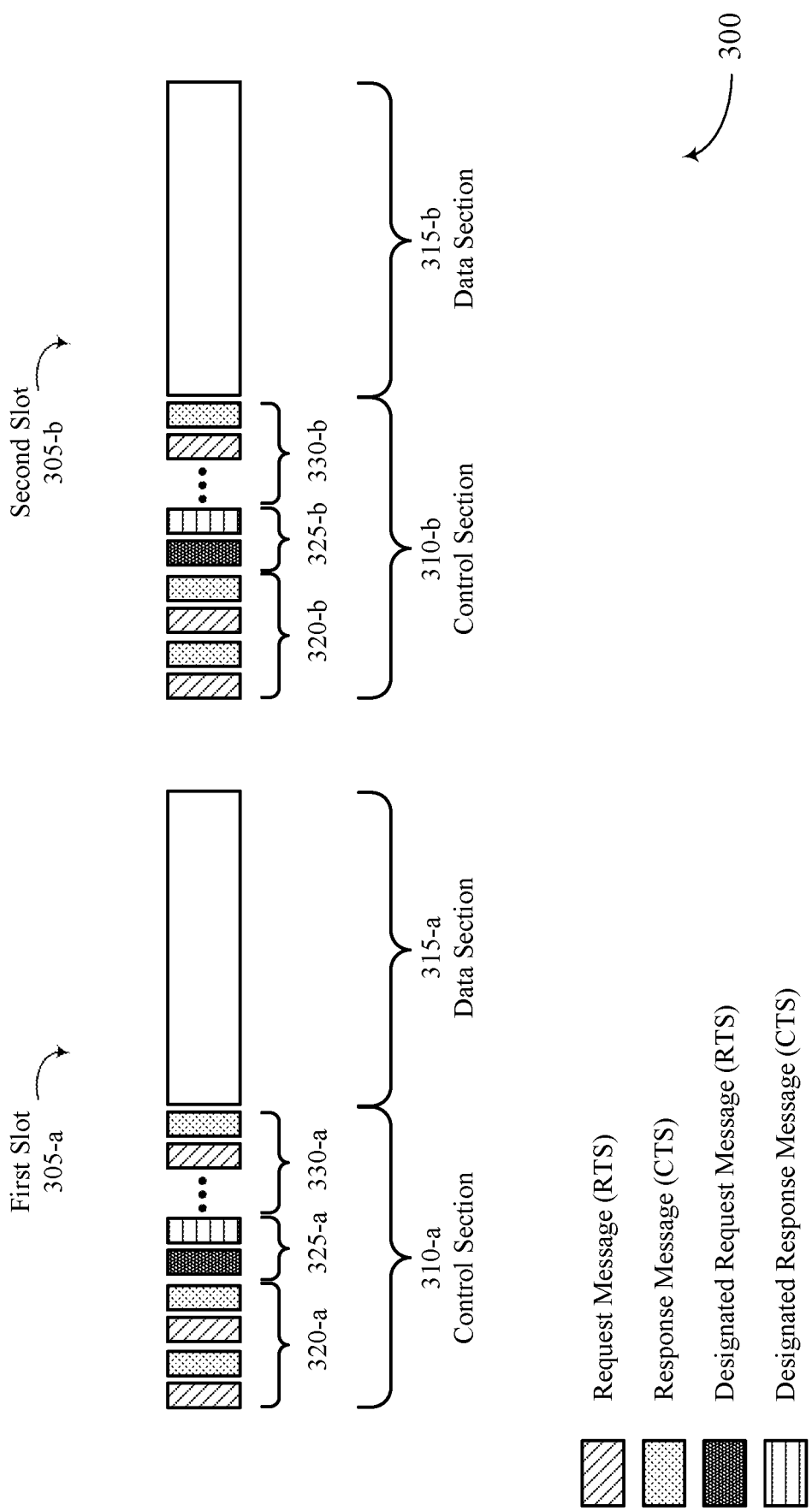
FIG. 3 illustrates an example of a sidelink diagram that supports techniques for control reduction in sidelink networks in accordance with aspects of the present disclosure.

FIG. 3 illustrates an example of a sidelink diagram 300 that supports techniques for control reduction in sidelink networks in accordance with aspects of the present disclosure. In some examples, the sidelink schematic diagram may implement aspects of wireless communications system 100 or 200. For example, the sidelink diagram 300 may support flexible portions of control sections of slots of a sidelink network which may be used for control signaling, data signaling, or both, as described with reference to FIGS. 1-2.

The sidelink diagram 300 illustrates a first slot 305-a and a second slot 305-b of a sidelink network. For example, the sidelink diagram 300 may illustrate the first slot 305-a and the second slot 305-b of the communication link 205-c illustrated in FIG. 2. Each of the first slot 305-a and the second slot 305-b may include a control section 310-a and 310-b (referred to herein collectively as control sections 310) and a data section 315-a and 315-b (referred to herein collectively as data sections 315), respectively. For example, the first slot 305-a may include a control section 310-a and a data section 315-a. Similarly, the second slot 305-b may include a control section 310-b and a data section 315-b. In some aspects, the control sections 310 may include one or more control symbol pairs for control signaling. For example, as shown in FIG. 3, each control symbol pair of the control section may include a first symbol for request messages (e.g., RTS messages) and a second symbol for response messages (e.g., CTS messages).

In some wireless communications systems, during a default mode of operation of Mode 2 of the sidelink network, the control sections 310 may be used only for control signaling (e.g., RTS messages, CTS messages, etc.), and the data sections 315 may be used for data transmission (e.g., sidelink messages). Under the default mode of operation of Mode 2 of the sidelink network, UEs 115 may transmit RTS messages CTS messages within the control symbol pairs of a control section 310-a or 310-b in an attempt to "claim" use of the data sections 315-a or 315-b of the respective slot. For example, a first UE 115 may transmit an RTS message to a second UE 115 in a first symbol of a control symbol pair of the control section 310-a of the first slot 305-a, and the second UE 115 may transmit a CTS message in a second symbol of the control symbol pair of the control section 310-a of the first slot 305-a. In this example, the RTS message may include a request to transmit data (e.g., a sidelink message) in the data section 315-a of the first slot 305-a, and the CTS message may include an acknowledgement for the first UE 115 to transmit the data in the data section 315-a.

In some aspects, higher-priority UEs 115 may transmit RTS and CTS messages towards the beginning of the control sections 310-a and 310-b, whereas lower-priority UEs 115 may monitor for higher-priority RTS and CTS messages and may transmit RTS and CTS messages later within the control sections 310-a and 310-b if no higher-priority UE 115 claims use of the data sections 315-a and 315-b. The UE 115 which wins or claims use of the data sections 315-a or 315-b may transmit sidelink messages within the respective data sections 315-a and 315-b. As noted previously herein, the relative priorities of UEs 115 (e.g., high-priority, low-priority) within the wireless communications system 200 may be configured semi-statically (e.g., pre-configured) or dynamically configured by the base station 105. In some aspects, the base station 105 may organize UEs 115 and assign relative priorities to the UEs 115 based on identifiers associated with the UEs 115. In some cases, the base station 105 may regularly or intermittently re-assign priorities to the UEs 115 so that the various UEs 115 may have relatively similar opportunities to claim use of the sidelink network and transmit sidelink messages.

In cases where a network includes a large quantity of UEs 115, the control section 310 of each slot may be extremely long (e.g., large quantity of control symbol pairs). However, in cases where only a few of the UEs 115 are actively trying to use the sidelink network, the resources allocated for control signaling within the control sections 310 (e.g., within the control symbol pairs) may remain unused, leading to inefficient use of resources within the sidelink network.

Accordingly, techniques described herein are directed to signaling for flexible control sections 310 which may enable more efficient use of resources within a sidelink network. In particular, signaling within the sidelink network may allow UEs 115 to transmit data (e.g., sidelink messages) within lower-priority portions (e.g., "flexible" portions) of sidelink control sections 310 (in addition to the data sections 315). In some cases, such techniques may be used when there are relatively few other UEs 115 attempting to use the sidelink network.

For example, in cases where the sidelink network is operating according to the "flexible control section" Mode 2 mode of operation, the control sections 310 of the slots 305 of the sidelink network (e.g., communication ink 205-c) may each include a first portion 320 for control signaling, a designated portion 325 for scheduling ongoing transmissions, and a second portion 330 which may flexibly be used for control signaling, data signaling, or both.

In some aspects, the first portions 320 may include one or more control symbol pairs for high-priority UEs 115. High-priority UEs 115 may be able to transmit RTS messages (and receive CTS messages) in the first portions 320 to claim use of the respective data sections 315. In this regard, the first portions 320 may additionally or alternatively be considered "high-priority portions 320" of the respective control sections 310.

The designated portions 325-a and 325-b may include portions of the respective control sections 310 which are used for scheduling ongoing transmissions. In this regard, each of the designated portions 325 may include a control symbol pair which includes a first symbol for transmitting a request message (e.g., RTS message) and a second symbol for transmitting a response message (e.g., CTS message). In some cases, the designated portions 325 may be designated for scheduling ongoing transmissions, and may therefore be reserved for a UE 115 which is transmitting data in a preceding slot. For example, a UE 115 may transmit data (e.g., sidelink messages) in the data section 315-a of the first slot 305-a. In this example, the designated portion 325-b of the control section 310-b of the second slot 305-b may be reserved to schedule an ongoing transmission from the UE 115 within at least a portion of the second slot. In this regard, the designated portion 325-*b* of the second slot 305-*b* may be reserved for scheduling an ongoing transmission which was carried out in the previous slot (e.g., first slot 305-*a*).

The second portions 330-*a* and 330-*b* may include one or more control symbol pairs which may be used for control signaling (e.g., RTS messages, CTS messages), data signaling (e.g., sidelink messages), or both. In some cases, the second portions 330 may be used for control signaling or data signaling based on whether or not an ongoing transmission was scheduled in the respective designated portions. For example, in cases where a UE 115 schedules an ongoing transmission in the designated portion 325-*b* of the second slot 305-*b*, the second portion 330-*b* of the second slot 305-*b* may be used for data transmission by the UE 115 that scheduled the ongoing transmission. By way of another example, in cases where no ongoing transmissions were scheduled in the designated portion 325-*b* of the second slot, the second portion 330-*b* of the second slot 305-*b* may be used by lower-priority UEs 115 to claim use of the data section 315-*b* of the second slot 305-*b*. In this regard, the second portions 330 may additionally or alternatively be referred to as "low-priority portions 320" of the respective control sections 310.

An example may prove to be illustrative. The first UE 115-*a* illustrated in FIG. 2 may transmit a first request message (e.g., first RTS message) in the first control section 310-*a* of the first slot 305-*a* of a sidelink network (e.g., communication link 205-*c*). If the first UE 115-*a* exhibits a high priority within the wireless communications system 200, the first UE 115-*a* may transmit the first RTS message within the first portion 320-*a* of the control section 310-*a*. If the first UE 115-*a* exhibits a low priority within the wireless communications system 200, the first UE 115-*a* may transmit the first RTS message within the second portion 320-*a* of the control section 310-*a*. The first RTS message may indicate a request for the first UE 115-*a* to transmit a first sidelink message in the data section 315-*a* of the first slot 305-*a*. The first RTS message may be transmitted in a first symbol of a control symbol pair of the control section 310-*a*.

Continuing with the same example, the second UE 115-*b* illustrated in FIG. 2 may transmit a first response message (e.g., first CTS message) in the control section 310-*a* of the first slot 305-*a*. The second CTS message may indicate an acknowledgement for the first UE 115-*a* to transmit the first sidelink message in the data section 315-*a* of the first slot 305-*a*. The first CTS message may be transmitted in a second symbol of the control symbol pair of the control section 310-*a* following the first symbol including the first RTS message.

The first UE 115-*a* may then transmit the first sidelink message to the second UE 115-*b* within the data section 315-*a* of the first slot 305-*a* based on receiving the first CTS message from the second UE 115-*b*. In some cases, the first UE 115-*a* may have additional information which is to be transmitted to the second UE 115-*b* in addition to the data transmitted in the first sidelink message. In such cases, the first UE 115-*a*, the second UE 115-*b*, or both, may monitor the first portion 320-*b* (e.g., high-priority portion 320-*b*) of the control section 310-*b* of the second slot 305-*b* for RTS messages, CTS messages, or both.

In cases where a higher-priority UE 115 claims use of the data section 315-*b* of the second slot 305-*b* by transmitting RTS/CTS messages in the first portion 320-*b* of the control section 310-*b* of the second slot 305-*b*, the first UE 115-*a* may be preempted from transmitting data in the second slot 305-*b*. In other cases where no other higher-priority UE 115 claims use of the second slot 305-*a* by transmitting RTS/CTS messages in the first portion 320-*b* of the control section 310-*b* of the second slot 305-*b*, the first UE 115-*a* may transmit a second RTS message in the designated portion 325-*b* of the control section 310-*b* of the second slot 305-*b* designated for scheduling ongoing transmissions. In this regard, the first UE 115-*a*, the second UE 115-*b*, or both, may monitor the first portion 320-*b* of the control portion 310-*b* of the second slot 305-*b* of the sidelink network for request messages (e.g., RTS messages), response messages (e.g., CTS messages 220), or both, received from additional UEs 115 of the wireless communications system 200.

In some cases, the first UE 115-*a*, the second UE 115-*b*, or both, may identify an RTS message, a CTS message, or both, within the first portion 320-*b* of the control section 310-*b* of the second slot 305-*b* based on monitoring the first portion 320-*b*. In some cases, the first UE 115-*a* may determine that another UE 115 (e.g., another high-priority UE 115) intends to transmit data within the second slot 305-*b* based on identifying the RTS message, the CTS message, or both, within the first portion 320-*b* of the control section of the second slot. In such cases, the first UE 115-*a* may refrain from transmitting a second RTS message in the designated portion 325-*b* of the control section 310-*b* of the second slot 305-*b* designated for scheduling ongoing transmissions based on identifying the RTS message, the CTS message, or both, within the first portion 320-*b* of the control section 310-*b* of the second slot 305-*b*. In this regard, the first UE 115-*a* may be preempted from transmitting a second RTS message, a second sidelink message, or both, in the second slot 305-*b* based on a higher-priority UE 115 transmitting RTS/CTS messages in the first portion 320-*b* of the second slot 305-*b*.

Similarly, the second UE 115-*b* may determine that another UE 115 (e.g., another high-priority UE 115) intends to transmit data within the second slot 305-*b* based on identifying the RTS message, the CTS message, or both, within the first portion 320-*b* of the control section 310-*b* of the second slot 305-*b*. In this example, the second UE 115-*b* may transmit a response message to the first UE 115-*a* indicating for the first UE 115-*a* to refrain from transmitting the second RTS message in the designated portion 325-*b* and/or to refrain from transmitting the second sidelink message in the second slot 305-*b*. In such cases, the first UE 115-*a* may refrain from transmitting the second RTS message, the second sidelink message, or both, in the second slot 305-*b* based on the response message received from the second UE 115-*b*.

In other cases, the first UE 115-*a*, the second UE 115-*b*, or both, may not identify any RTS message or CTS message within the first portion 320-*b* of the control section 310-*b* of the second slot 305-*b*. In this regard, the first UE 115-*a*, the second UE 115-*b*, or both, may identify an absence of RTS or CTS messages within the first portion 320-*b* of the control section 310-*b* of the second slot 305-*b*. In such a case, the first UE 115-*a* may determine that it is free to transmit the second RTS message in the designated portion 325-*b* of the second control section 310-*b* of the second slot 305-*b* based on the absence of RTS or CTS messages within the first portion 320-*b* of the control section 310-*b* of the second slot 305-*b*.

In some aspects, the second RTS message transmitted in the designated portion 325-*b* of the control section 310-*b* of the second slot 305-*b* may indicate a request to transmit the second sidelink message in at least one portion of the second slot 305-*b*. In some aspects, the second UE 115-*b* may transmit a second response message (e.g., second CTS message) to the first UE 115-*a* in the designated portion 325-*b* of the control section 310-*b* of the second slot 305-*b*. For example, the second CTS message may be transmitted in a second symbol of the designated portion 325-*b* (e.g., designated control symbol pair) for scheduling ongoing transmissions within the control section 310-*b* of the second slot 305-*b*. The second CTS message may indicate an acknowledgement (e.g., acceptance) for the first UE 115-*a* to transmit the second sidelink message in the at least one portion of the second slot 305-*b* of the sidelink network (e.g., communication link 205-*c*).

The first UE 115-*a* may transmit the second sidelink message to the second UE 115-*b* in the at least one portion of the second slot 305-*b* based on transmitting the second RTS message in the designated portion 325-*b*, receiving the second CTS message in the designated portion 325-*b*, or both. Additionally, the first UE 115-*a* may transmit the second sidelink message to the second UE 115-*b* in the at least one portion of the second slot 305-*b* based on determining the absence of RTS or CTS messages within the first portion 320-*b* of the control section 310-*b* of the second slot 305-*b*. In some aspects, the at least one portion of the second slot 305-*b* within which the second sidelink message is transmitted may include the second portion 330-*b* of the control section 310-*b* of the second slot 305-*b*, the data section 315-*b* of the second slot 305-*b*, or both.

For example, in some cases, the first UE 115-*a* may transmit the second sidelink message in the second portion 330-*b* of the control section 310-*b* of the second slot 305-*b*. In some cases, the second portion 330-*b* may be positioned within the control section 310-*b* of the second slot 305-*a* following the first portion 320-*b*, the designated portion 325-*b*, or both, as shown in FIG. 3. By way of another example, in other cases, the first UE 115-*a* may transmit the second sidelink message in the data section 315-*b* of the second slot 305-*b*. Furthermore, in other cases, the first UE 115-*a* may transmit the second sidelink message in both the second portion 330-*b* of the second control section 310-*b* of the second slot 305-*b* and the data section 315-*b* of the second slot 305-*b*. For instance, the first UE 115-*a* may transmit a first portion of the second sidelink message in the second portion 330-*b* of the control section 310-*b* of the second slot 305-*b*, and may transmit a second portion of the second sidelink message in the data section 315-*b* of the second slot 305-*b*.

Additionally, or alternatively, in cases where the first UE 115-*a*, the second UE 115-*b*, or both, identifies an RTS message, a CTS message, or both, within the first portion 320-*b* of the control section 310-*b* of the second slot 305-*b*, the first UE 115-*a* may share the second slot 305-*b* with the high-priority UE 115 associated with the RTS message, the CTS message, or both. For instance, while monitoring the first portion 320-*b* of the control section 310-*b* of the second slot 305-*b*, the first UE 115-*a* may identify an RTS message transmitted by a third UE 115 (e.g., high-priority UE 115) requesting to transmit data within the second slot 305-*b*. In such a case, the first UE 115-*a* may still transmit the second RTS message in the designated portion 325-*b* of the second slot 305-*b* by sharing the second slot 305-*b* with the third UE 115. For instance, the first UE 115-*a* may identify a first subset of the second slot 305-*b* (e.g., first portion of the data section 315-*b* of the second slot 305-*b*) allocated for data transmission by the third UE 115, and identify a second subset of the second slot 305-*b* (e.g., second portion of the data section 315-*b* of the second slot 305-*b*) allocated for data transmission by the first UE 115-*a*. The first UE 115-*a* may then transmit the second sidelink message in the second subset of the second slot 305-*b* after the data transmission by the third UE 115 within the first subset of the second slot 305-*b*. In this regard, the first UE 115-*a* may transmit the second sidelink message in a subset of the at least one portion of the second slot 305-*b* based on identifying an RTS/CTS message in the first portion 320-*b* of the control section 310-*b* of the second slot 305-*b*.

In some cases, the designated portions 320 may be used to claim use of at least a portion of a subsequent slot. For example, in some cases, the first UE 115 may transmit a request message (e.g., RTS message) in the designated portion 325-*a* of the first slot 305-*a*, where the request message includes a request to transmit data in at least a portion of the second slot 305-*b* (e.g., second portion 330-*b*, data section 315-*b*).

In some aspects, various parameters (e.g., characteristics) of the slots 305 of the sidelink network may be semi-statically or dynamically configured. For example, as shown in FIG. 2, the base station 105 may semi-statically or dynamically configure parameters of the slots 305-*a* and 305-*b* illustrated in FIG. 3 via control messages 210. Parameters of the slots 305 which may be semi-statically or dynamically configured may include a position of the designated portions 325 within the respective control sections 310, a size of the first portions 320 (e.g., high-priority portions 320), a size of the second portions 320 (e.g., low-priority portions 330), or any combination thereof. Moreover, the base station 105 may be configured to selectively modify parameters of the slots 305 based on any number of characteristics including, but not limited to, a quantity of UEs 115 attempting to use the sidelink network.

For example, the base station 105 may transmit control messages 210-*a* and 210-*b* to the first UE 115-*a* and the second UE 115-*b*, respectively, where the control messages 210-*a* and 210-*b* indicate a position of the designated portions 325 within the control sections 310 of the slots 305 of the sidelink network. In this example, the first UE 115-*a*, the second UE 115-*b*, or both, may determine the position of the designated portions 325, and may transmit RTS messages and CTS messages within the designated portions 325 based on determining the position of the designated portions 325.

By way of another example, the base station 105 may transmit control messages 210-*a* and 210-*b* to the first UE 115-*a* and the second UE 115-*b*, respectively, where the control messages 210-*a* and 210-*b* indicate a first size of the first portions 320 and a second size of the second portions 330. In this example, the first UE 115-*a*, the second UE 115-*b*, or both, may determine the sizes of the first portions 320 and the second portions 330, and may transmit RTS messages and CTS messages within the designated portions 325 based on determining the first size of the first portions 320 and the second size of the second portions 330.

In some aspects, the base station 105 may semi-statically or dynamically adjust the relative sizes of the first portions 320 and the second portions 330 based on a number of UEs 115 which are attempting to use the sidelink network. In cases where the base station 105 determines there is a larger quantity of UEs 115 attempting to use the sidelink network, the base station 105 may increase the first size of the first portions 320 (e.g., via control messages 210). By increasing the size of the first portions 320, the base station 105 may effectively increase a quantity of UEs 115 which have an opportunity to transmit RTS/CTS messages within the first portions 320 to claim use of the data sections 315 and pre-empt an ongoing transmission from being scheduled.

Conversely, in cases where the base station 105 determines there is a smaller quantity of UEs 115 attempting to use the sidelink network, the base station 105 may decrease the first size of the first portions 320 (e.g., via control messages 210). By decreasing the size of the first portions 320, the base station 105 may effectively decrease a quantity of UEs 115 which have an opportunity to transmit RTS/CTS messages within the first portions 320. In some aspects, the base station 105 may compare a determined quantity of UEs 115 which are attempting to use the sidelink network to one or more thresholds in order to determine relative sizes of the first portions 320 and second portions 330.

By providing the designated portions 325 for scheduling ongoing transmissions and allowing the second portions 330 of control sections 310 of slots 305 of the sidelink network to be flexibly used for control signaling (e.g., RTS messages 215, CTS messages 220), data signaling (e.g., sidelink messages), or both, techniques described herein may provide for more efficient use of resources within the sidelink network.

Figure 4:
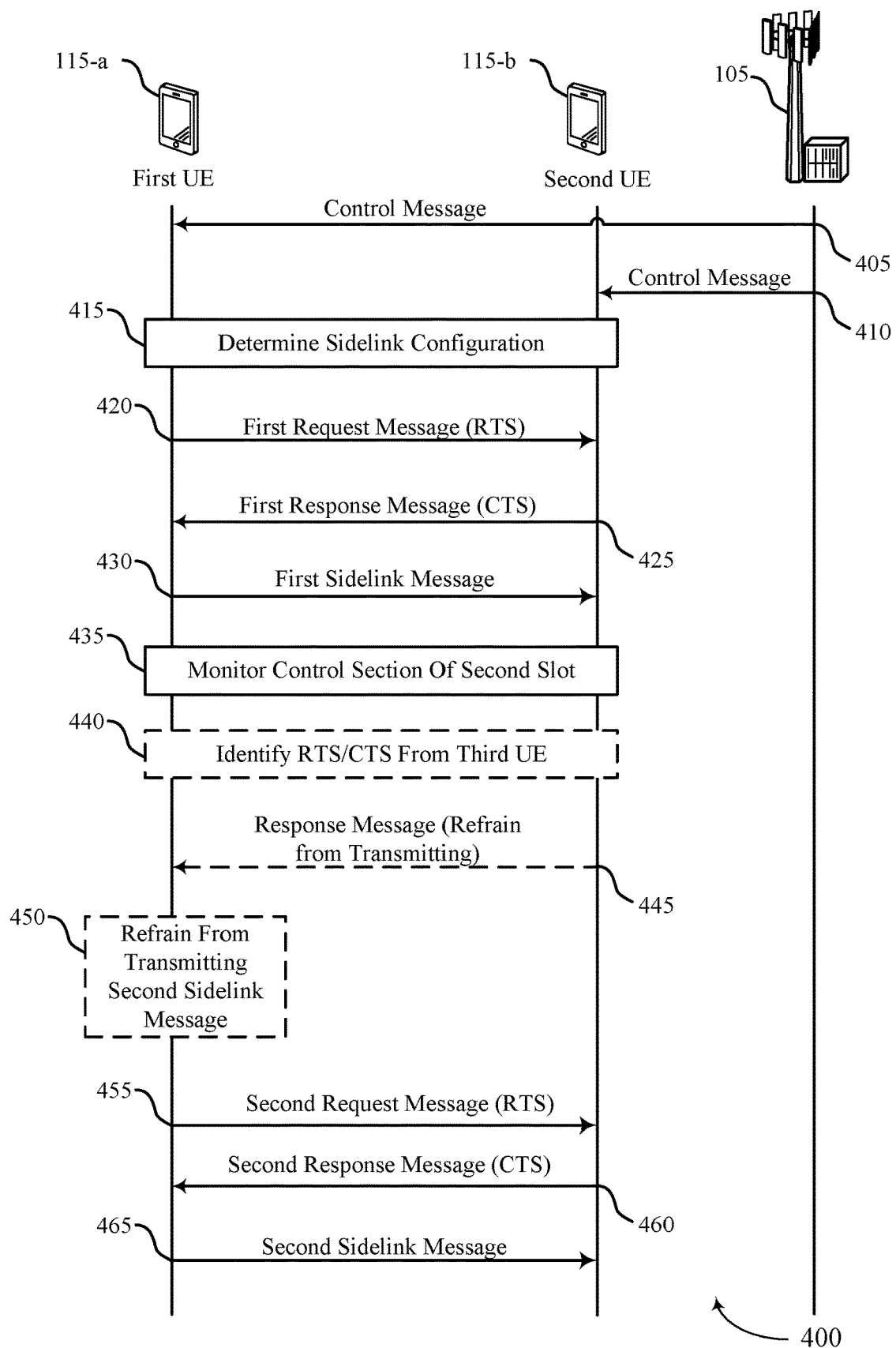
FIG. 4 illustrates an example of a process flow that supports techniques for control reduction in sidelink networks in accordance with aspects of the present disclosure.

FIG. 4 illustrates an example of a process flow 400 that supports techniques for control reduction in sidelink networks in accordance with aspects of the present disclosure. In some examples, process flow 400 may implement aspects of wireless communications system 100 or 200, and sidelink diagram 300. For example, the process flow 400 may illustrate transmitting a first sidelink message, monitoring a first portion of a second slot, transmitting a second request message in a designated portion of the second slot for scheduling ongoing transmissions, and transmitting a second sidelink message based on transmitting the second request message, as described with reference to FIGS. 1-3.

In some cases, process flow 400 may include a first UE 115-*a*, a second UE 115-*b*, and a base station 105 which may be examples of corresponding devices as described herein. The first UE 115-*a* and the second UE 115-*b* illustrated in FIG. 4 may be examples of the first UE 115-*a* and the second UE 115-*b*, respectively, illustrated in FIG. 2. Similarly, the base station 105 illustrated in FIG. 4 may be an example of the base station 105 illustrated in FIG. 2. In some aspects, the first UE 115-*a* and the second UE 115-*b* may communicate over a sidelink communication link, such as the communication link 205-*c* illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405 and 410, the base station 105 may transmit control messages to the first UE 115-*a* and the second UE 115-*b*, respectively. In some aspects, the control messages may indicate whether or not a sidelink network (or at least a portion of a sidelink network) is managed (e.g., coordinated) by the base station 105. In this regard, the control messages may indicate a Mode 1 sidelink operation in which the sidelink network is managed by the base station 105 or a Mode 2 sidelink operation in which the sidelink network is not managed by the base station 105. Additionally, or alternatively, the control messages may include indications to transition from Mode 1 to Mode 2, or vice versa. In additional or alternative aspects, the control messages may indicate a "default" Mode 2 operation or a "flexible control section" Mode 2 operation. In this regard, the control messages may indicate whether one or more portions of control sections of slots of the sidelink network may be optionally used for control signaling, data signaling, or both.

In some aspects, the control messages transmitted at 405 and 410 may configure or adjust various parameters of the slots 305 illustrated in FIG. 3. Parameters of the slots 305-*a* and 305-*b* which may be semi-statically or dynamically configured via the configuration messages transmitted at 405 and 410 may include a position of the designated portions 325 within the respective control sections 310, a size of the first portions 320 (e.g., high-priority portions 320), a size of the second portions 320 (e.g., low-priority portions 330), or any combination thereof. Moreover, the base station 105 may transmit the control messages at 405 and 410 to selectively modify parameters of the slots 305 based on any number of characteristics including, but not limited to, a quantity of UEs 115 attempting to use the sidelink network.

At 415, the first UE 115-*a*, the second UE 115-*b*, or both, may determine a sidelink configuration for communications over the sidelink network. The first UE 115-*a* and the second UE 115-*b* may determine the sidelink configuration based on the control messages received at 405 and 410. The first UE 115-*a* and the second UE 115-*b* may determine the sidelink configuration by determining one or more parameters associated with communications over the sidelink network (e.g., over the communication link 205-*c* illustrated in FIG. 2). For example, the first UE 115-*a*, the second UE 115-*b*, or both, may determine whether the sidelink network is operated in Mode 1 or Mode 2, and may further determine whether the sidelink network is operated in the "default" Mode 2 or the "flexible control section" Mode 2. By way of another example, the first UE 115-*a*, the second UE 115-*b*, or both, may determine a position of designated portions 325 within control sections 310 of slots 305 of the sidelink network, a first size of the first portions 320 of the control sections 310, a second size of the second portions 330 of the control sections 310, or any combination thereof.

At 420, the first UE 115-*a* may transmit a first request message (e.g., first RTS message) to the second UE 115-*b*. The first UE 115-*a* may transmit the first request message via a sidelink communication link (e.g., communication link 205-*c* illustrated in FIG. 2) of the sidelink network. The first request message may be transmitted in a first control section 310-*a* of a first slot 305-*a*, as shown in FIG. 3. In some aspects, the first request message may include a request for the first UE 115-*a* to transmit a first sidelink message in a data section 315-*a* of the first slot 305-*a*.

At 425, the second UE 115-*b* may transmit a first response message (e.g., first CTS message) to the first UE 115-*a*. The second UE 115-*b* may transmit the first response message via the sidelink communication link (e.g., communication link 205-*c* illustrated in FIG. 2) of the sidelink network. The first response message may be transmitted in the first control section 310-*a* of the first slot 305-*a*, as shown in FIG. 3. In some aspects, the first response message may include an acknowledgement (e.g., acceptance) for the first UE 115-*a* to transmit the first sidelink message in the data section 315-*a* of the first slot 305-*a*.

At 430, the first UE 115-*a* may transmit the first sidelink message to the second UE 115-*b*. The first UE 115-*a* may transmit the first sidelink message via the sidelink communication link (e.g., communication link 205-*c* illustrated in FIG. 2) of the sidelink network. The first sidelink message may be transmitted in the data section 315-*a* of the first slot 305-*a*, as shown in FIG. 3.

At 435, the first UE 115-*a*, the second UE 115-*b*, or both, may monitor a second control section 310-*b* of a second slot 305-*b* of the sidelink network for request messages (e.g., RTS messages), response messages (e.g., CTS messages), or both, received from another UE 115 (e.g., a third UE 115). For example, the first UE 115-*a*, the second UE 115-*b*, or both, may monitor the first portion 320-*a* of the control section 310-*b* of the second slot 305-*a*. In some cases, the first UE 115-*a*, the second UE 115-*b*, or both, may monitor the second control section of the second slot based on determining that the first UE 115-*a* has additional data to be transmitted to the second UE 115-*b* in addition to the data transmitted via the first sidelink message transmitted at 430.

At 440, the first UE 115-*a*, the second UE 115-*b*, or both, may identify a request message (e.g., RTS message), a response message (e.g., CTS message), or both, received from another UE 115 within the second control section 310-*b* of the second slot 305-*b*. The first UE 115-*a* and the second UE 115-*b* may identify request messages, response messages, or both, based on monitoring the control section 310-*b* of the second slot 305-*b* at 435.

In cases where neither the first UE 115-*a* or the second UE 115-*b* identify a request message or response message from another UE 115 at 440, the process flow 400 may proceed to 455. In cases where the first UE 115-*a*, the second UE 115-*b*, or both, identify a request message or response message from another UE 115 at 440, the process flow 400 may proceed to 445.

At 445, the second UE 115-*b* may transmit a response message based on the second UE 115-*b* identifying a request message, a response message, or both, received from another UE 115 at 440. In some aspects, the response message transmitted at 445 may include an indication for the first UE 115-*a* to refrain from transmitting the second request message in the designated portion 325-*b* of the second slot 305-*b*.

At 450, the first UE 115-*a* may refrain from transmitting the second request message in the designated portion 325-*b* of the second slot 305-*b*. In some aspects, the first UE 115-*a* may refrain from transmitting the second request message at 450 based on the first UE 115-*a* identifying request message or response message from another UE 115 at 440. Additionally or alternatively, the first UE 115-*a* may refrain from transmitting the second request message at 450 based on receiving the response message received from the second UE 115-*b* at 445.

At 455, the first UE 115-*a* may transmit a second request message (e.g., second RTS message) to the second UE 115-*b*. The first UE 115-*a* may transmit the second request message via the sidelink communication link (e.g., communication link 205-*c* illustrated in FIG. 2) of the sidelink network. The second request message may be transmitted in a designated portion 325-*b* of the control section 310-*b* of a second slot 305-*b*, as shown in FIG. 3. In some aspects, the second request message may include a request for the first UE 115-*a* to transmit a second sidelink message in at least one portion of the second slot 305-*b*. In some aspects, the first UE 115-*a* may transmit the second request message at 455 based on identifying an absence of request messages or response messages in the first portion 320-*b* of the control section 310-*b* of the second slot 305-*b* at 435.

At 460, the second UE 115-*b* may transmit a second response message (e.g., second CTS message) to the first UE 115-*a*. The second UE 115-*b* may transmit the second response message via the sidelink communication link (e.g., communication link 205-*c* illustrated in FIG. 2) of the sidelink network. The second response message may be transmitted in the designated portion 325-*b* of the control section 310-*b* of the second slot 305-*a*, as shown in FIG. 3. In some aspects, the second response message may include an acknowledgement (e.g., acceptance) for the first UE 115-*a* to transmit the second sidelink message in the one or more portions of the second slot 305-*b*.

At 465, the first UE 115-*a* may transmit the second sidelink message to the second UE 115-*b*. The first UE 115-*a* may transmit the second sidelink message via the sidelink communication link (e.g., communication link 205-*c* illustrated in FIG. 2) of the sidelink network. The second sidelink message may be transmitted in the one or more portions of the second slot 305-*b*. For example, in some cases, the first UE 115-*a* may transmit the second sidelink message in the second portion 330-*b* of the control section 310-*b* of the second slot 305-*b*. By way of another example, in other cases, the first UE 115-*a* may transmit the second sidelink message in the data section 315-*b* of the second slot 305-*b*. Furthermore, in other cases, the first UE 115-*a* may transmit the second sidelink message in both the second portion 330-*b* of the second control section 310-*b* of the second slot 305-*b* and the data section 315-*b* of the second slot 305-*b*. For instance, the first UE 115-*a* may transmit a first portion of the second sidelink message in the second portion 330-*b* of the control section 310-*b* of the second slot 305-*b*, and may transmit a second portion of the second sidelink message in the data section 315-*b* of the second slot 305-*b*.

Additionally or alternatively, in cases where the first UE 115-*a*, the second UE 115-*b*, or both, identifies a request message, a response message, or both, at 435, the first UE 115-*a* may share the second slot 305-*b* with another UE 115 which requested to use the second slot 305-*b*. For instance, the first UE 115-*a* may identify an RTS message transmitted by a third UE 115 (e.g., high-priority UE 115) requesting to transmit data within the second slot 305-*b* at 435. In such a case, the first UE 115-*a* may identify a first subset of the second slot 305-*b* allocated for data transmission by the third UE 115, and identify a second subset of the second slot 305-*b* allocated for data transmission by the first UE 115-*a*. The first UE 115-*a* may then transmit the second sidelink message at 465 in the second subset of the second slot 305-*b* after the data transmission by the third UE 115 within the first subset of the second slot 305-*b*.

The techniques described with respect to FIG. 3 may provide for more efficient use of resources within the sidelink network, and may reduce the amount of resources which are wasted (e.g., unused) in the control portions of the slots of the sidelink network.

Figure 5:
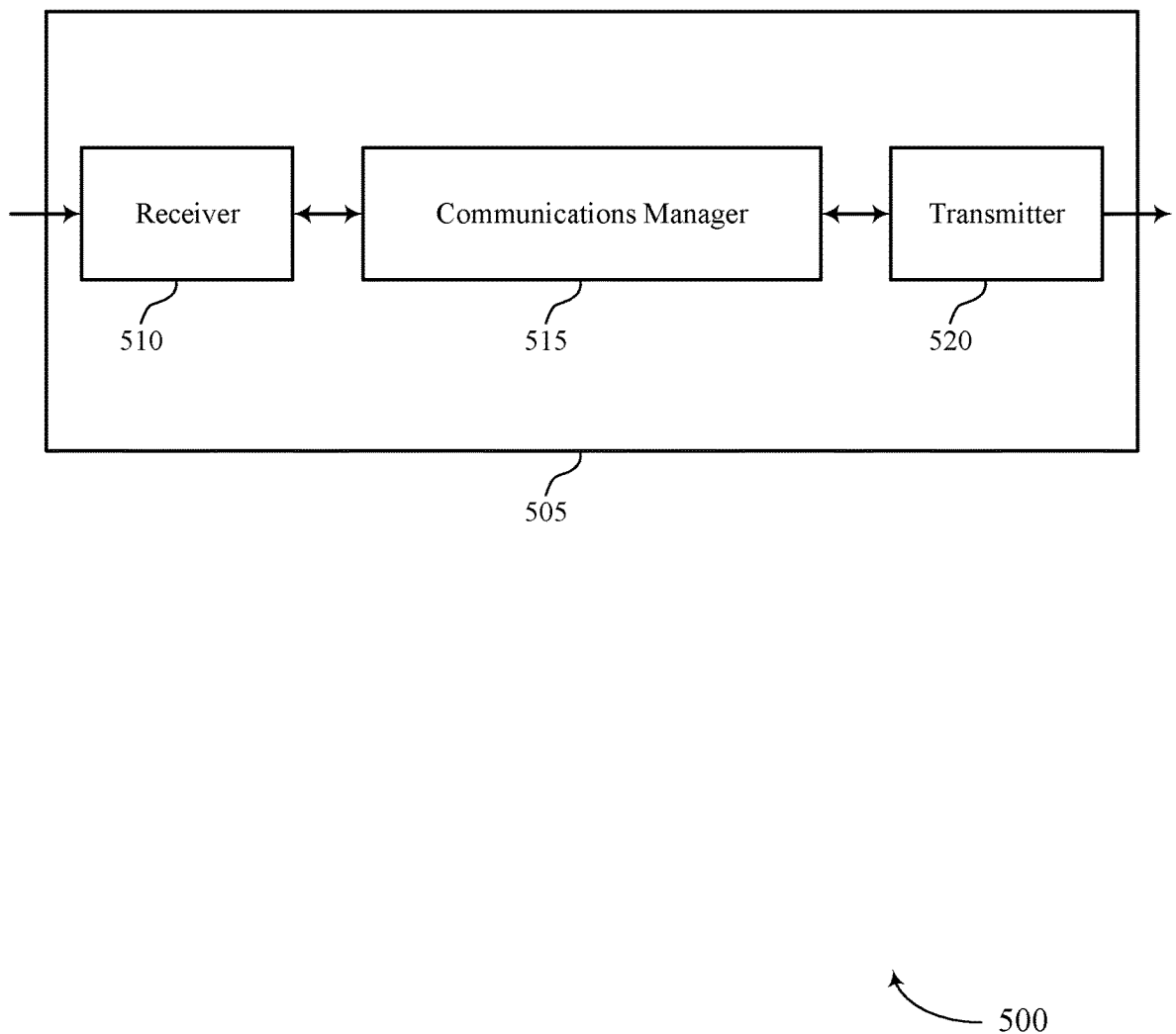
FIGS. 5 and 6 show block diagrams of devices that support techniques for control reduction in sidelink networks in accordance with aspects of the present disclosure.

FIG. 5 shows a block diagram 500 of a device 505 that supports techniques for control reduction in sidelink networks in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for control reduction in sidelink networks, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a second UE, a first request message in a first control section of a first slot of a sidelink network, the first request message indicating a request to transmit a first sidelink message in a first data section of the first slot, transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network, transmit, to the second UE, the first sidelink message in the first data section of the first slot of the sidelink network based on transmitting the first request message, transmit, to the second UE, the second sidelink message in the at least one portion of the second slot based on transmitting the second request message, and monitor a first portion of a second control section of a second slot of the sidelink network for one or more request messages or one or more response messages. The communications manager 515 may also receive, from a second UE, a first request message in a first control section of a first slot of a sidelink network, the first request message indicating a request for the second UE to transmit a first sidelink message in a first data section of the first slot, receive, from the second UE, a second request message in a portion of the second control section of the second slot designated for scheduling ongoing transmissions based on monitoring the first portion of the second control section, the second request message indicating a request for the second UE to transmit a second sidelink message in at least one portion of the second slot of the sidelink network, receive, from the second UE, the first sidelink message in the data section of the first slot of the sidelink network based on receiving the first request message, receive, from the second UE, the second sidelink message in the at least one portion of the second slot based on receiving the second request message, and monitor a first portion of a second control section of a second slot of the sidelink network for one or more request messages or one or more response messages. The communications manager 515 may be an example of aspects of the communications manager 810 described herein.

The actions performed by the communications manager 515 as described herein may be implemented to realize one or more potential advantages. For example, enabling portions (e.g., second portions 330) of control sections 310 of slots 305 of sidelink networks to be optionally used for control signaling, data signaling, or both, may enable more efficient use of resources within the sidelink network. In particular, by reducing control overhead associated with the control sections 310, the techniques described herein may enable UEs 115 to reduce a quantity of control signaling which may be monitored, thereby reduce power consumption of the UEs 115.

By enabling more efficient use of resources within the sidelink network and reducing a quantity of control signaling within the sidelink network which may be monitored, a processor of the UE 115 (e.g., a processor controlling the receiver 510, the communications manager 515, the transmitter 520, etc.) may reduce processing resources used for sidelink communications and sidelink monitoring. Moreover, by enabling UEs 115 to schedule ongoing transmissions, data which is to be transmitted by the UEs 115 over the sidelink network may be transmitted more quickly and efficiently, correspondingly reducing a number of times the processor ramps up processing power and turns on processing units to handle sidelink message transmission, sidelink message reception, and sidelink network monitoring.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
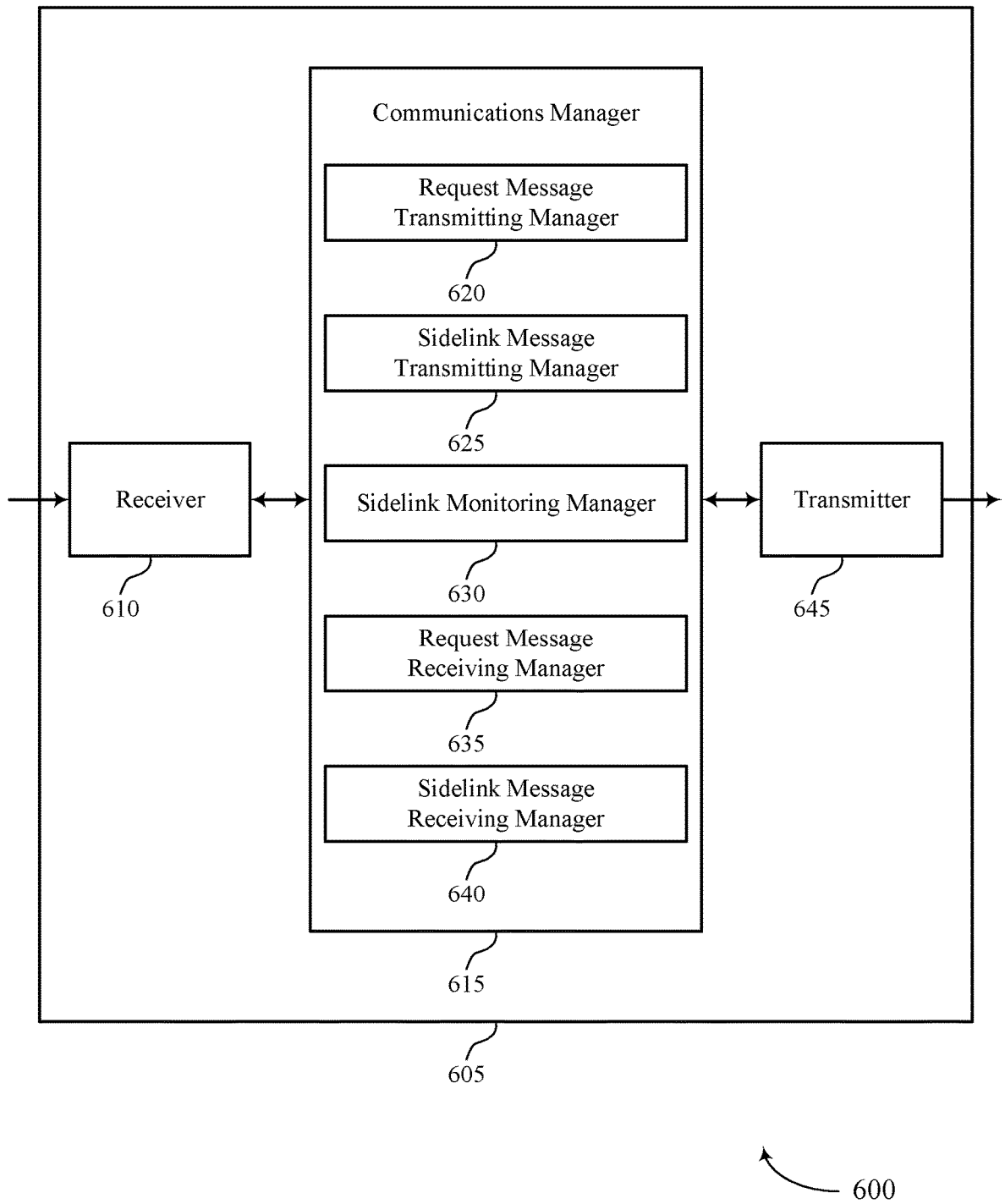

FIG. 6 shows a block diagram 600 of a device 605 that supports techniques for control reduction in sidelink networks in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to techniques for control reduction in a sidelink network, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a request message transmitting manager 620, a sidelink message transmitting manager 625, a sidelink monitoring manager 630, a request message receiving manager 635, and a sidelink message receiving manager 640. The communications manager 615 may be an example of aspects of the communications manager 810 described herein.

The request message transmitting manager 620 may transmit, to a second UE, a first request message in a first control section of a first slot of a sidelink network, the first request message indicating a request to transmit a first sidelink message in a first data section of the first slot. The request message transmitting manager 620 may also transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network.

The sidelink message transmitting manager 625 may transmit, to the second UE, the first sidelink message in the first data section of the first slot of the sidelink network based on transmitting the first request message and transmit, to the second UE, the second sidelink message in the at least one portion of the second slot based on transmitting the second request message.

The sidelink monitoring manager 630 may monitor a first portion of a second control section of a second slot of the sidelink network for one or more request messages or one or more response messages.

The request message receiving manager 635 may receive, from a second UE, a first request message in a first control section of a first slot of a sidelink network, the first request message indicating a request for the second UE to transmit a first sidelink message in a first data section of the first slot. The request message receiving manager 635 may also receive, from the second UE, a second request message in a portion of the second control section of the second slot designated for scheduling ongoing transmissions based on monitoring the first portion of the second control section, the second request message indicating a request for the second UE to transmit a second sidelink message in at least one portion of the second slot of the sidelink network.

The sidelink message receiving manager 640 may receive, from the second UE, the first sidelink message in the data section of the first slot of the sidelink network based on receiving the first request message. The sidelink message receiving manager 640 may also receive, from the second UE, the second sidelink message in the at least one portion of the second slot based on receiving the second request message.

The transmitter 645 may transmit signals generated by other components of the device 605. In some examples, the transmitter 645 may be collocated with a receiver 610 in a transceiver component. For example, the transmitter 645 may be an example of aspects of the transceiver 820 described with reference to FIG. 8. The transmitter 645 may utilize a single antenna or a set of antennas.

Figure 7:
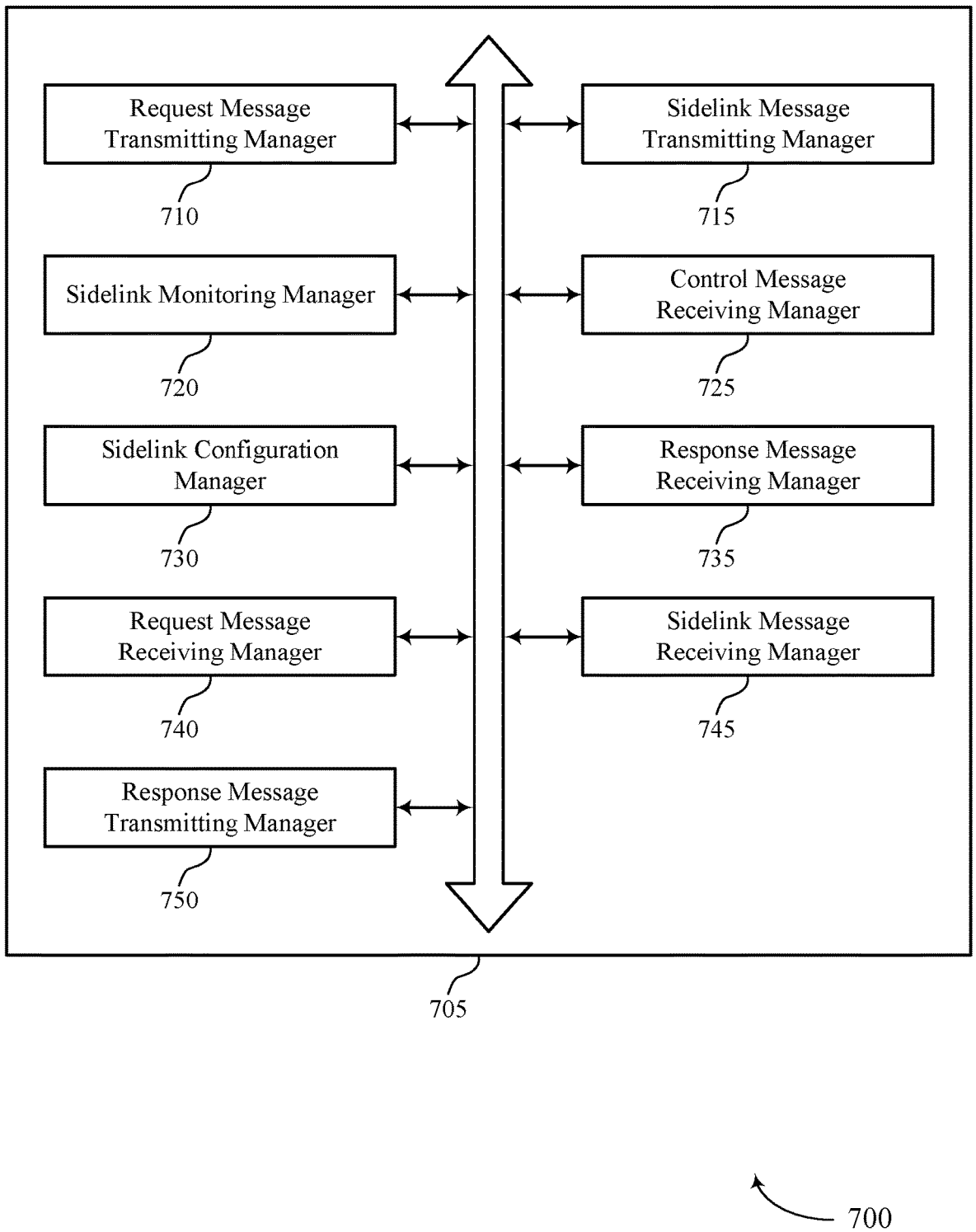
FIG. 7 shows a block diagram of a communications manager that supports techniques for control reduction in sidelink networks in accordance with aspects of the present disclosure.

FIG. 7 shows a block diagram 700 of a communications manager 705 that supports techniques for control reduction in sidelink networks in accordance with aspects of the present disclosure. The communications manager 705 may be an example of aspects of a communications manager 515, a communications manager 615, or a communications manager 810 described herein. The communications manager 705 may include a request message transmitting manager 710, a sidelink message transmitting manager 715, a sidelink monitoring manager 720, a control message receiving manager 725, a sidelink configuration manager 730, a response message receiving manager 735, a request message receiving manager 740, a sidelink message receiving manager 745, and a response message transmitting manager 750. Each of these components may communicate, directly or indirectly, with one another (e.g., via one or more buses).

The request message transmitting manager 710 may transmit, to a second UE, a first request message in a first control section of a first slot of a sidelink network, the first request message indicating a request to transmit a first sidelink message in a first data section of the first slot. In some examples, the request message transmitting manager 710 may transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network.

The sidelink message transmitting manager 715 may transmit, to the second UE, the first sidelink message in the first data section of the first slot of the sidelink network based on transmitting the first request message. In some examples, the sidelink message transmitting manager 715 may transmit, to the second UE, the second sidelink message in the at least one portion of the second slot based on transmitting the second request message. In some examples, the sidelink message transmitting manager 715 may transmit, to the second UE, the second sidelink message in a second portion of the second control section of the second slot. In some examples, the sidelink message transmitting manager 715 may transmit a first portion of the second sidelink message in the second portion of the second control section of the second slot. In some examples, the sidelink message transmitting manager 715 may transmit a second portion of the second sidelink message in a second data section of the second slot. In some examples, transmitting the second sidelink message in the at least one portion of the second slot includes transmitting the second sidelink message in a subset of the at least one portion of the second slot.

In some examples, the sidelink message transmitting manager 715 may refrain from transmitting the second sidelink message in the at least one portion of the second slot based on receiving the third request message. In some examples, the sidelink message transmitting manager 715 may transmit the second sidelink message in a second portion of the data section of the second slot based on receiving the third request message. In some examples, the sidelink message transmitting manager 715 may transmit at least one portion of the second sidelink message in a second portion of the second control section of the second slot that follows the portion of the second control section designated for scheduling ongoing transmissions.

The sidelink monitoring manager 720 may monitor a first portion of a second control section of a second slot of the sidelink network for one or more request messages or one or more response messages. In some examples, the sidelink monitoring manager 720 may monitor a first portion of a second control section of a second slot of the sidelink network for one or more request messages or one or more response messages. In some examples, the sidelink monitoring manager 720 may identify an absence of a third request message in the first portion of the second control section of the second slot based on monitoring the first portion, where transmitting the second request message is based on identifying the absence of the third request message in the first portion. In some examples, the sidelink monitoring manager 720 may receive, from a third UE, a third request message in the first portion of the second control section of the second slot based on monitoring the first portion. In some examples, the sidelink monitoring manager 720 may identify an absence of a third request message in the first portion of the second control section of the second slot based on monitoring the first portion, where receiving the second request message is based on identifying the absence of the third request message in the first portion.

The request message receiving manager 740 may receive, from a second UE, a first request message in a first control section of a first slot of a sidelink network, the first request message indicating a request for the second UE to transmit a first sidelink message in a first data section of the first slot. In some examples, the request message receiving manager 740 may receive, from the second UE, a second request message in a portion of the second control section of the second slot designated for scheduling ongoing transmissions based on monitoring the first portion of the second control section, the second request message indicating a request for the second UE to transmit a second sidelink message in at least one portion of the second slot of the sidelink network. In some examples, the request message receiving manager 740 may receive, from a third UE, a third request message in the first portion of the second control section of the second slot based on monitoring the first portion.

The sidelink message receiving manager 745 may receive, from the second UE, the first sidelink message in the data section of the first slot of the sidelink network based on receiving the first request message. In some examples, the sidelink message receiving manager 745 may receive, from the second UE, the second sidelink message in the at least one portion of the second slot based on receiving the second request message. In some examples, the sidelink message receiving manager 745 may receive, from the second UE, the second sidelink message in a second portion of the second control section of the second slot. In some examples, the sidelink message receiving manager 745 may receive a first portion of the second sidelink message in the second portion of the second control section of the second slot. In some examples, the sidelink message receiving manager 745 may receive a second portion of the second sidelink message in a second data section of the second slot. In some examples, receiving the second sidelink message in the at least one portion of the second slot includes receiving the second sidelink message in a subset of the at least one portion of the second slot. In some examples, the sidelink message receiving manager 745 may receive the second sidelink message in a second portion of the data section of the second slot based on receiving the third request message. In some examples, the sidelink message receiving manager 745 may receive at least one portion of the second sidelink message in a second portion of the second control section of the second slot that follows the portion of the second control section designated for scheduling ongoing transmissions.

The control message receiving manager 725 may receive, from a base station, a control message indicating that the first UE uses a first mode when communicating over the sidelink network, the first mode allowing one or more portions of the second control section of the second slot to be scheduled to communicate data, where transmitting the second request message is based on receiving the control message. In some examples, the control message receiving manager 725 may receive, from a base station, a control message indicating a first size of the first portion of the second control section of the second slot and a second size of a second portion of the second control section of the second slot, the second portion of the second control section configured to be allocated to communicate data between the first UE and the second UE, where transmitting the second request message is based on receiving the control message indicating the first size and the second size.

In some examples, the control message receiving manager 725 may receive, from a base station, a control message indicating that the first UE uses a first mode when communicating over the sidelink network, the first mode allowing one or more portions of the second control section of the second slot to be scheduled to communicate data, where receiving the second request message is based on receiving the control message. In some examples, the control message receiving manager 725 may receive, from a base station, a control message indicating a first size of the first portion of the second control section of the second slot and a second size of a second portion of the second control section of the second slot, the second portion of the second control section configured to be allocated to communicate data between the first UE and the second UE, where receiving the second request message is based on receiving the control message indicating the first size and the second size.

The sidelink configuration manager 730 may determine a position of the portion of the second control section of the second slot designated for scheduling ongoing transmissions based on receiving the control message, where transmitting the second request message is based on determining the position. In some examples, the sidelink configuration manager 730 may identify a first portion of the data section of the second slot allocated for data transmission by the third UE. In some examples, the sidelink configuration manager 730 may determine that a sidelink communication link of the sidelink network is not managed by a base station, where transmitting the first request message, the second request message, or both, may be based on determining that the sidelink communication link is not managed by the base station.

In some examples, the sidelink configuration manager 730 may determine a position of the portion of the second control section of the second slot designated for scheduling ongoing transmissions based on receiving the control message, where receiving the second request message is based on determining the position. In some examples, the sidelink configuration manager 730 may identify a first portion of the data section of the second slot allocated for data transmission by the third UE. In some examples, the sidelink configuration manager 730 may determine that a sidelink communication link of the sidelink network is not managed by a base station, where receiving the first request message, the second request message, or both, may be based on determining that the sidelink communication link is not managed by the base station.

The response message receiving manager 735 may receive, from the second UE, a first response message in the first control section of the first slot, where transmitting the first sidelink message in the first data section of the first slot is based on receiving the first response message. In some examples, the response message receiving manager 735 may receive, from the second UE, a second response message in the portion of the second control section of the second slot designated for scheduling ongoing transmissions, where transmitting the second sidelink message is based on receiving the second response message.

The response message transmitting manager 750 may transmit, to the second UE, a response message indicating for the second UE to refrain from transmitting the second sidelink message in the at least one portion of the second slot based on receiving the third request message. In some examples, the response message transmitting manager 750 may transmit, to the second UE, a first response message in the first control section of the first slot, where receiving the first sidelink message in the first data section of the first slot is based on transmitting the first response message. In some examples, the response message transmitting manager 750 may transmit, to the second UE, a second response message in the portion of the second control section of the second slot designated for scheduling ongoing transmissions, where receiving the second sidelink message is based on receiving the second response message.

Figure 8:
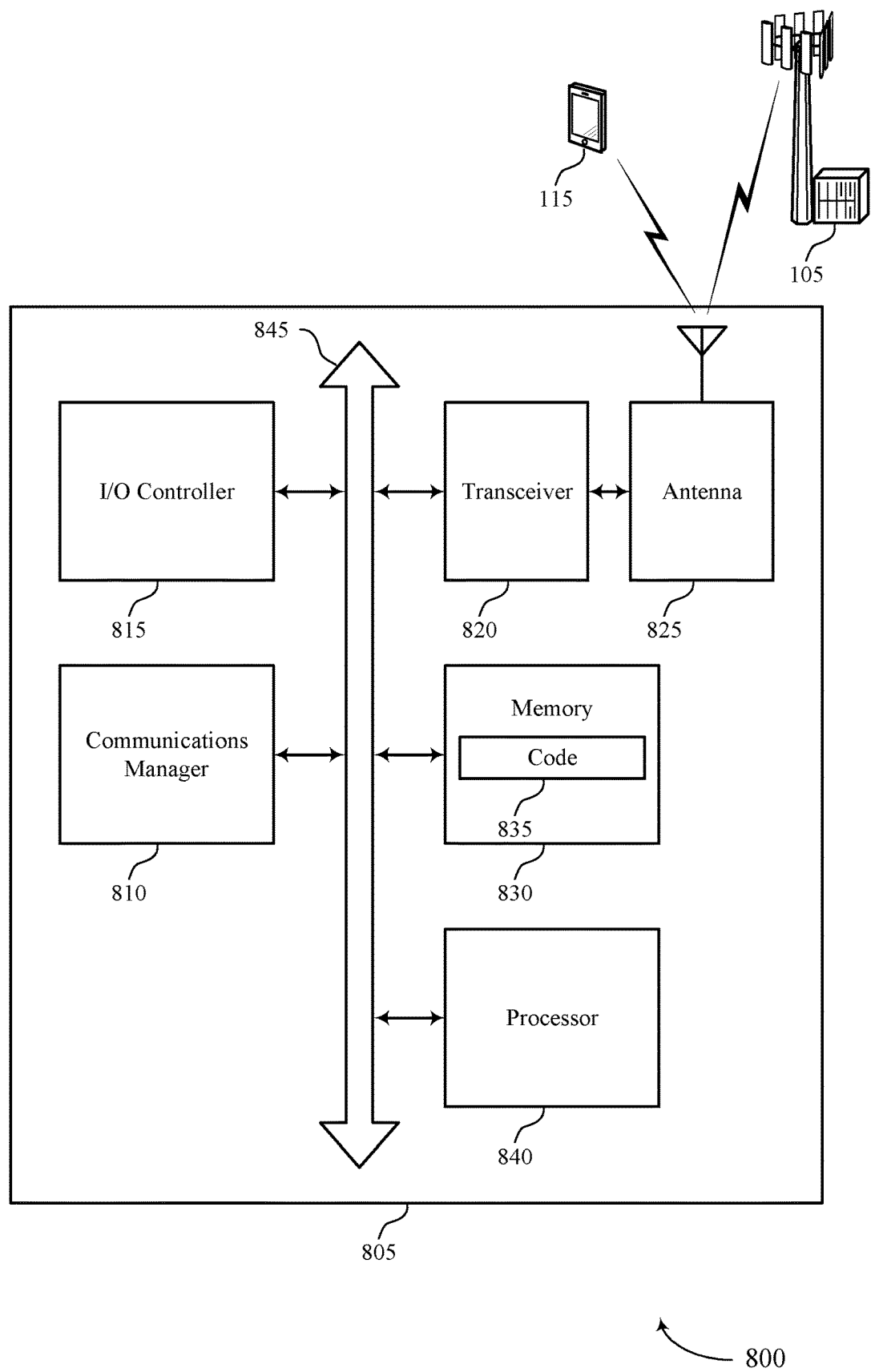
FIG. 8 shows a diagram of a system including a device that supports techniques for control reduction in sidelink networks in accordance with aspects of the present disclosure.

FIG. 8 shows a diagram of a system 800 including a device 805 that supports techniques for control reduction in sidelink networks in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a second UE, a first request message in a first control section of a first slot of a sidelink network, the first request message indicating a request to transmit a first sidelink message in a first data section of the first slot. The communications manager 810 may transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network. The communications manager 810 may also transmit, to the second UE, the first sidelink message in the first data section of the first slot of the sidelink network based on transmitting the first request message. The communications manager 810 may further transmit, to the second UE, the second sidelink message in the at least one portion of the second slot based on transmitting the second request message. The communications manager 810 may monitor a first portion of a second control section of a second slot of the sidelink network for one or more request messages or one or more response messages.

The communications manager 810 may also receive, from a second UE, a first request message in a first control section of a first slot of a sidelink network, the first request message indicating a request for the second UE to transmit a first sidelink message in a first data section of the first slot. The communications manager 810 may also receive, from the second UE, a second request message in a portion of the second control section of the second slot designated for scheduling ongoing transmissions based on monitoring the first portion of the second control section, the second request message indicating a request for the second UE to transmit a second sidelink message in at least one portion of the second slot of the sidelink network. The communications manager 810 may also receive, from the second UE, the first sidelink message in the data section of the first slot of the sidelink network based on receiving the first request message. The communications manager 810 may receive, from the second UE, the second sidelink message in the at least one portion of the second slot based on receiving the second request message. The communications manager 810 may also monitor a first portion of a second control section of a second slot of the sidelink network for one or more request messages or one or more response messages.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for control reduction in sidelink networks).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
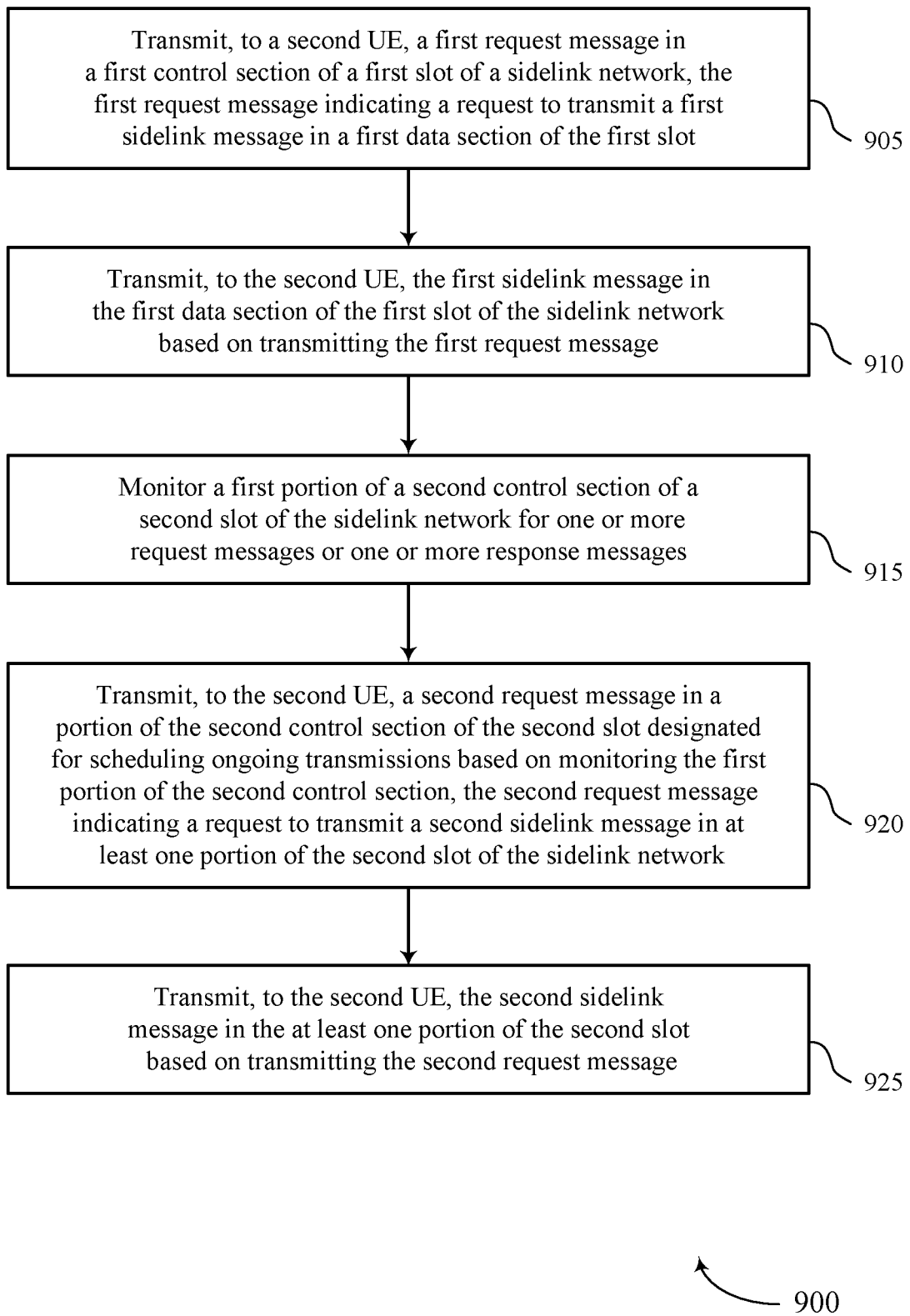
FIGS. 9 through 12 show flowcharts illustrating methods that support techniques for control reduction in sidelink networks in accordance with aspects of the present disclosure.

FIG. 9 shows a flowchart illustrating a method 900 that supports techniques for control reduction in sidelink networks in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may transmit, to a second UE, a first request message in a first control section of a first slot of a sidelink network, the first request message indicating a request to transmit a first sidelink message in a first data section of the first slot. The operations of 905 may be performed according to the methods described herein. In some examples, aspects of the operations of 905 may be performed by a request message transmitting manager as described with reference to FIGS. 5 through 8.

At 910, the UE may transmit, to the second UE, the first sidelink message in the first data section of the first slot of the sidelink network based on transmitting the first request message. The operations of 910 may be performed according to the methods described herein. In some examples, aspects of the operations of 910 may be performed by a sidelink message transmitting manager as described with reference to FIGS. 5 through 8.

At 915, the UE may monitor a first portion of a second control section of a second slot of the sidelink network for one or more request messages or one or more response messages. The operations of 915 may be performed according to the methods described herein. In some examples, aspects of the operations of 915 may be performed by a sidelink monitoring manager as described with reference to FIGS. 5 through 8.

At 920, the UE may transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network. The operations of 920 may be performed according to the methods described herein. In some examples, aspects of the operations of 920 may be performed by a request message transmitting manager as described with reference to FIGS. 5 through 8.

At 925, the UE may transmit, to the second UE, the second sidelink message in the at least one portion of the second slot based on transmitting the second request message. The operations of 925 may be performed according to the methods described herein. In some examples, aspects of the operations of 925 may be performed by a sidelink message transmitting manager as described with reference to FIGS. 5 through 8.

Figure 10:
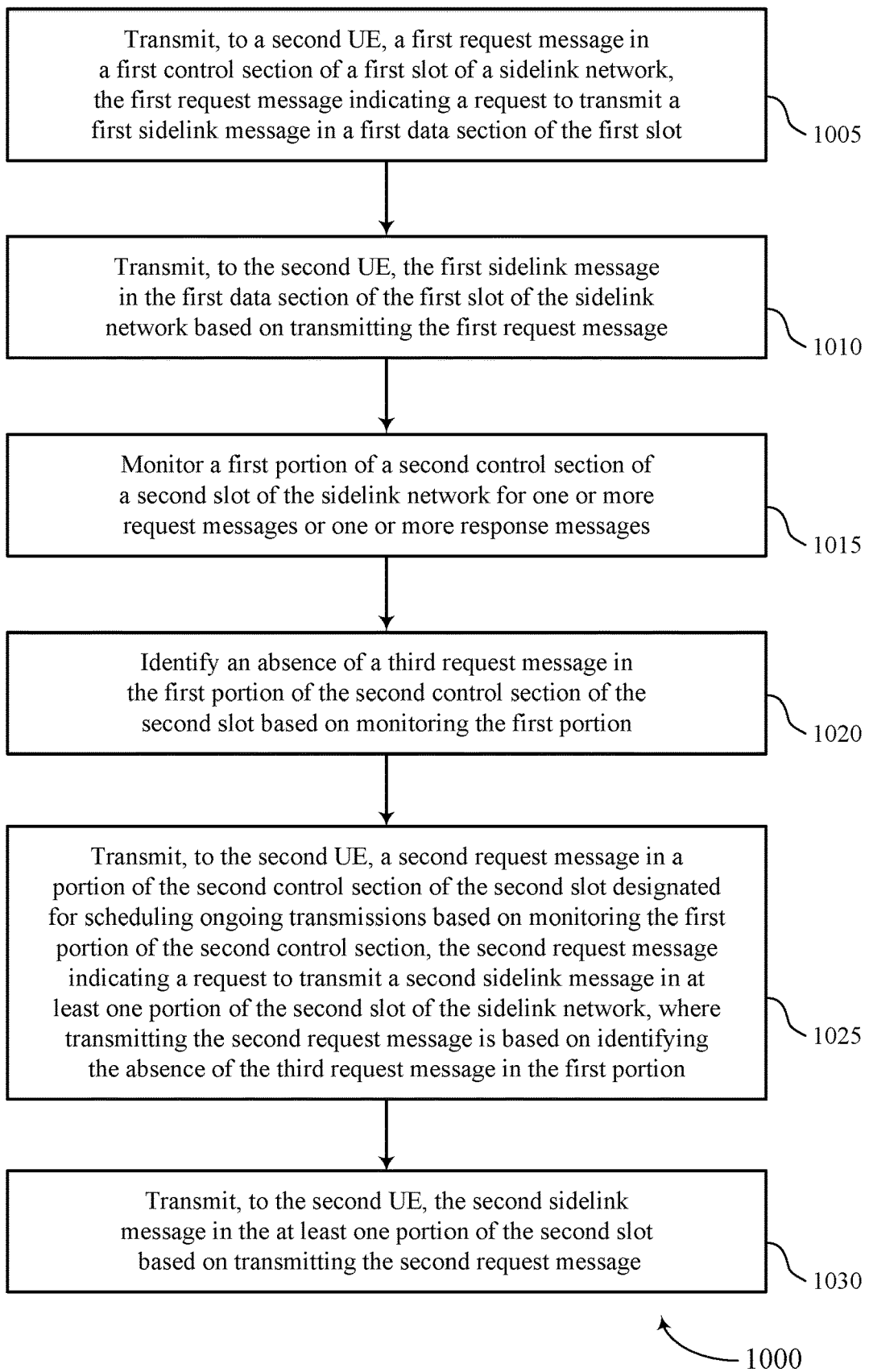

FIG. 10 shows a flowchart illustrating a method 1000 that supports techniques for control reduction in sidelink networks in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may transmit, to a second UE, a first request message in a first control section of a first slot of a sidelink network, the first request message indicating a request to transmit a first sidelink message in a first data section of the first slot. The operations of 1005 may be performed according to the methods described herein. In some examples, aspects of the operations of 1005 may be performed by a request message transmitting manager as described with reference to FIGS. 5 through 8.

At 1010, the UE may transmit, to the second UE, the first sidelink message in the first data section of the first slot of the sidelink network based on transmitting the first request message. The operations of 1010 may be performed according to the methods described herein. In some examples, aspects of the operations of 1010 may be performed by a sidelink message transmitting manager as described with reference to FIGS. 5 through 8.

At 1015, the UE may monitor a first portion of a second control section of a second slot of the sidelink network for one or more request messages or one or more response messages. The operations of 1015 may be performed according to the methods described herein. In some examples, aspects of the operations of 1015 may be performed by a sidelink monitoring manager as described with reference to FIGS. 5 through 8.

At 1020, the UE may identify an absence of a third request message in the first portion of the second control section of the second slot based on monitoring the first portion. The operations of 1020 may be performed according to the methods described herein. In some examples, aspects of the operations of 1020 may be performed by a sidelink monitoring manager as described with reference to FIGS. 5 through 8.

At 1025, the UE may transmit, to the second UE, a second request message in a portion of the second control section of the second slot designated for scheduling ongoing transmissions based on monitoring the first portion of the second control section, the second request message indicating a request to transmit a second sidelink message in at least one portion of the second slot of the sidelink network, where transmitting the second request message is based on identifying the absence of the third request message in the first portion. The operations of 1025 may be performed according to the methods described herein. In some examples, aspects of the operations of 1025 may be performed by a request message transmitting manager as described with reference to FIGS. 5 through 8.

At 1030, the UE may transmit, to the second UE, the second sidelink message in the at least one portion of the second slot based on transmitting the second request message. The operations of 1030 may be performed according to the methods described herein. In some examples, aspects of the operations of 1030 may be performed by a sidelink message transmitting manager as described with reference to FIGS. 5 through 8.

Figure 11:
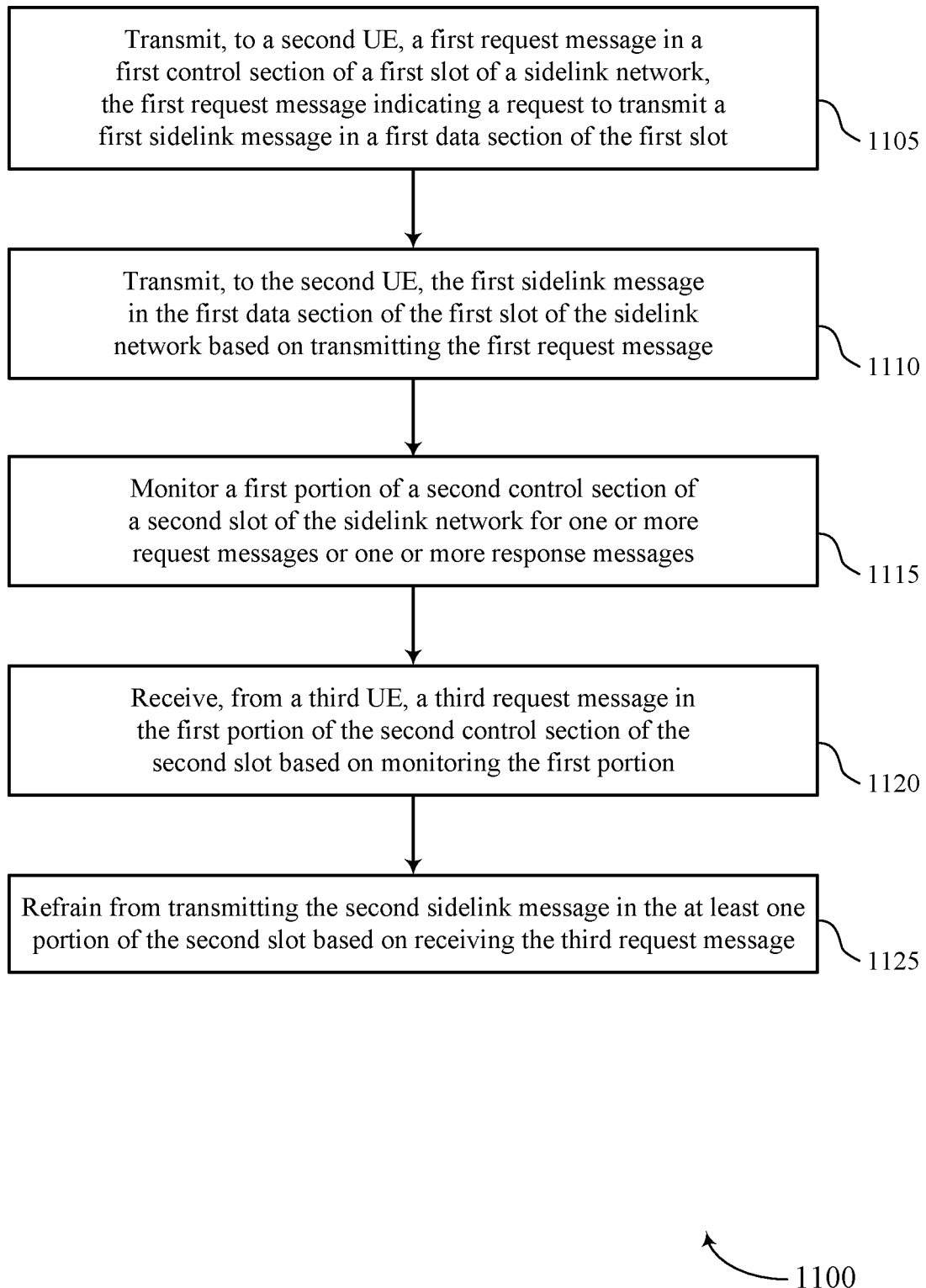

FIG. 11 shows a flowchart illustrating a method 1100 that supports techniques for control reduction in sidelink networks in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may transmit, to a second UE, a first request message in a first control section of a first slot of a sidelink network, the first request message indicating a request to transmit a first sidelink message in a first data section of the first slot. The operations of 1105 may be performed according to the methods described herein. In some examples, aspects of the operations of 1105 may be performed by a request message transmitting manager as described with reference to FIGS. 5 through 8.

At 1110, the UE may transmit, to the second UE, the first sidelink message in the first data section of the first slot of the sidelink network based on transmitting the first request message. The operations of 1110 may be performed according to the methods described herein. In some examples, aspects of the operations of 1110 may be performed by a sidelink message transmitting manager as described with reference to FIGS. 5 through 8.

At 1115, the UE may monitor a first portion of a second control section of a second slot of the sidelink network for one or more request messages or one or more response messages. The operations of 1115 may be performed according to the methods described herein. In some examples, aspects of the operations of 1115 may be performed by a sidelink monitoring manager as described with reference to FIGS. 5 through 8.

At 1120, the UE may receive, from a third UE, a third request message in the first portion of the second control section of the second slot based on monitoring the first portion. The operations of 1120 may be performed according to the methods described herein. In some examples, aspects of the operations of 1120 may be performed by a sidelink monitoring manager as described with reference to FIGS. 5 through 8.

At 1125, the UE may refrain from transmitting the second sidelink message in the at least one portion of the second slot based on receiving the third request message. The operations of 1125 may be performed according to the methods described herein. In some examples, aspects of the operations of 1125 may be performed by a sidelink message transmitting manager as described with reference to FIGS. 5 through 8.

Figure 12:
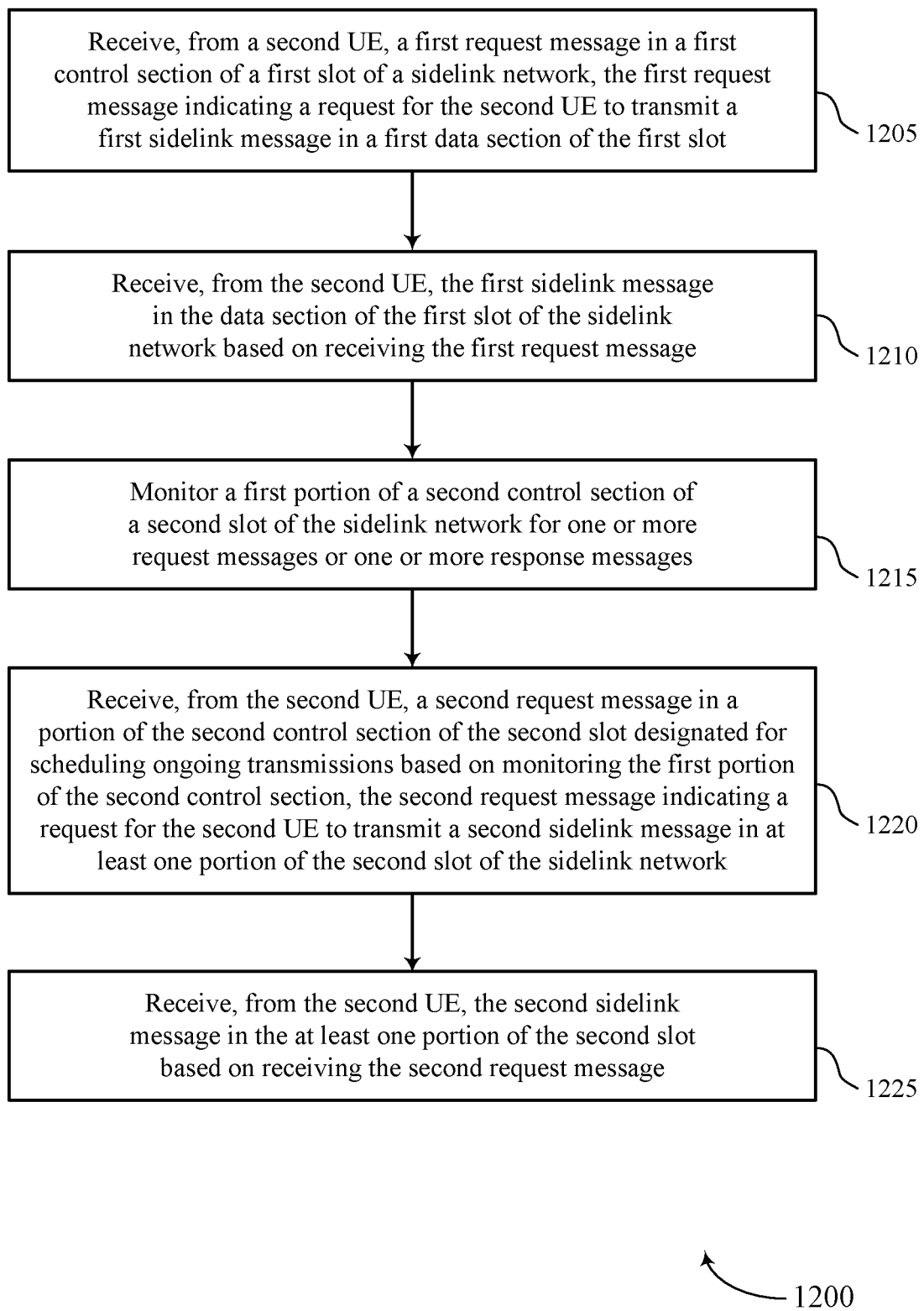

FIG. 12 shows a flowchart illustrating a method 1200 that supports techniques for control reduction in sidelink networks in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may receive, from a second UE, a first request message in a first control section of a first slot of a sidelink network, the first request message indicating a request for the second UE to transmit a first sidelink message in a first data section of the first slot. The operations of 1205 may be performed according to the methods described herein. In some examples, aspects of the operations of 1205 may be performed by a request message receiving manager as described with reference to FIGS. 5 through 8.

At 1210, the UE may receive, from the second UE, the first sidelink message in the data section of the first slot of the sidelink network based on receiving the first request message. The operations of 1210 may be performed according to the methods described herein. In some examples, aspects of the operations of 1210 may be performed by a sidelink message receiving manager as described with reference to FIGS. 5 through 8.

At 1215, the UE may monitor a first portion of a second control section of a second slot of the sidelink network for one or more request messages or one or more response messages. The operations of 1215 may be performed according to the methods described herein. In some examples, aspects of the operations of 1215 may be performed by a sidelink monitoring manager as described with reference to FIGS. 5 through 8.

At 1220, the UE may receive, from the second UE, a second request message in a portion of the second control section of the second slot designated for scheduling ongoing transmissions based on monitoring the first portion of the second control section, the second request message indicating a request for the second UE to transmit a second sidelink message in at least one portion of the second slot of the sidelink network. The operations of 1220 may be performed according to the methods described herein. In some examples, aspects of the operations of 1220 may be performed by a request message receiving manager as described with reference to FIGS. 5 through 8.

At 1225, the UE may receive, from the second UE, the second sidelink message in the at least one portion of the second slot based on receiving the second request message. The operations of 1225 may be performed according to the methods described herein. In some examples, aspects of the operations of 1225 may be performed by a sidelink message receiving manager as described with reference to FIGS. 5 through 8.

It should be noted that the methods described herein describe possible implementations, and that the operations may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Aspect 1 is a method for wireless communication at a first UE that includes transmitting, to a second UE, a first request message in a first control section of a first slot of a sidelink network, the first request message indicating a request to transmit a first sidelink message in a first data section of the first slot; transmitting, to the second UE, the first sidelink message in the first data section of the first slot of the sidelink network based at least in part on transmitting the first request message; monitoring a first portion of a second control section of a second slot of the sidelink network for one or more request messages or one or more response messages; transmitting, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and transmitting, to the second UE, the second sidelink message in the at least one portion of the second slot based at least in part on transmitting the second request message.

In Aspect 2, the method of Aspect 1 transmitting the second sidelink message may further include transmitting, to the second UE, the second sidelink message in a second portion of the second control section of the second slot.

In Aspect 3, the method of Aspect 2 transmitting the second sidelink message may further include transmitting a first portion of the second sidelink message in the second portion of the second control section of the second slot; and transmitting a second portion of the second sidelink message in a second data section of the second slot.

In Aspect 4, the method of any of Aspects 1 through 3, may include receiving, from a base station, a control message indicating that the first UE uses a first mode when communicating over the sidelink network, the first mode allowing one or more portions of the second control section of the second slot to be scheduled to communicate data, where transmitting the second request message is based at least in part on receiving the control message.

In Aspect 5, the method of Aspect 4 may further include determining a position of the portion of the second control section of the second slot designated for scheduling ongoing transmissions based at least in part on receiving the control message, where transmitting the second request message is based at least in part on determining the position.

In Aspect 6, the method of any of Aspects 1 through 5 may further include receiving, from a base station, a control message indicating a first size of the first portion of the second control section of the second slot and a second size of a second portion of the second control section of the second slot, the second portion of the second control section configured to be allocated to communicate data between the first UE and the second UE, where transmitting the second request message is based at least in part on receiving the control message indicating the first size and the second size.

In Aspect 7, the method of any of Aspects 1 through 6 may further include identifying an absence of a third request message in the first portion of the second control section of the second slot based at least in part on monitoring the first portion, where transmitting the second request message is based at least in part on identifying the absence of the third request message in the first portion.

In Aspect 8, the method of any of Aspects 1 through 6 may further include receiving, from a third UE, a third request message in the first portion of the second control section of the second slot based at least in part on monitoring the first portion.

In Aspect 9, the method of Aspect 8, transmitting the second sidelink message in the at least one portion of the second slot may include transmitting the second sidelink message in a subset of the at least one portion of the second slot.

In Aspect 10, the method of Aspect 8 may further include refraining from transmitting the second sidelink message in the at least one portion of the second slot based at least in part on receiving the third request message.

In Aspect 11, the method of Aspect 8 may further include identifying a first portion of a second data section of the second slot allocated for data transmission by the third UE; and transmitting the second sidelink message in a second portion of the second data section of the second slot based at least in part on receiving the third request message.

In Aspect 12, transmitting the second sidelink message in any of Aspects 1 through 11 may include transmitting at least one portion of the second sidelink message in a second portion of the second control section of the second slot that follows the portion of the second control section designated for scheduling ongoing transmissions.

In Aspect 13, the method of any of Aspects 1 through 12 may further include receiving, from the second UE, a first response message in the first control section of the first slot, where transmitting the first sidelink message in the first data section of the first slot is based at least in part on receiving the first response message.

In Aspect 14, the method of any of Aspects 1 through 13 may further include receiving, from the second UE, a second response message in the portion of the second control section of the second slot designated for scheduling ongoing transmissions, where transmitting the second sidelink message is based at least in part on receiving the second response message.

In Aspect 15, the method of any of Aspects 1 through 14 may further include determining that a sidelink communication link of the sidelink network is not managed by a base station, where transmitting the first request message, the second request message, or both, is based at least in part on determining that the sidelink communication link is not managed by the base station.

Aspect 16 is a method for wireless communication at a first UE, including: receiving, from a second UE, a first request message in a first control section of a first slot of a sidelink network, the first request message indicating a request for the second UE to transmit a first sidelink message in a first data section of the first slot; receiving, from the second UE, the first sidelink message in the first data section of the first slot of the sidelink network based at least in part on receiving the first request message; monitoring a first portion of a second control section of a second slot of the sidelink network for one or more request messages or one or more response messages; receiving, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and receiving, from the second UE, the second sidelink message in the at least one portion of the second slot based at least in part on receiving the second request message.

In Aspect 17, the method of Aspect 16 may further include receiving, from the second UE, the second sidelink message in a second portion of the second control section of the second slot.

In Aspect 18, receiving the second sidelink message in Aspect 17 may further include receiving a first portion of the second sidelink message in the second portion of the second control section of the second slot; and receiving a second portion of the second sidelink message in a second data section of the second slot.

In Aspect 19, the method of any of Aspects 16 through 18 may further include receiving, from a base station, a control message indicating that the first UE uses a first mode when communicating over the sidelink network, the first mode allowing one or more portions of the second control section of the second slot to be scheduled to communicate data, where receiving the second request message is based at least in part on receiving the control message.

In Aspect 20, the method of any of Aspects 16 through 19 may further include determining a position of the portion of the second control section of the second slot designated for scheduling ongoing transmissions based at least in part on receiving the control message, where receiving the second request message is based at least in part on determining the position.

In Aspect 21, the method of any of Aspects 16 through 20 may further include receiving, from a base station, a control message indicating a first size of the first portion of the second control section of the second slot and a second size of a second portion of the second control section of the second slot, the second portion of the second control section configured to be allocated to communicate data between the first UE and the second UE, where receiving the second request message is based at least in part on receiving the control message indicating the first size and the second size.

In Aspect 22, the method of any of claims 16 through 21 may further include identifying an absence of a third request message in the first portion of the second control section of the second slot based at least in part on monitoring the first portion, where receiving the second request message is based at least in part on identifying the absence of the third request message in the first portion.

In Aspect 23, the method of any of Aspects 16 through 21 may further include receiving, from a third UE, a third request message in the first portion of the second control section of the second slot based at least in part on monitoring the first portion.

In Aspect 24, receiving the second sidelink message in the at least one portion of the second slot in the method of Aspect 23 may include receiving the second sidelink message in a subset of the at least one portion of the second slot.

In Aspect 25, the method of any of Aspects 23 and 24 may further include transmitting, to the second UE, a response message indicating for the second UE to refrain from transmitting the second sidelink message in the at least one portion of the second slot based at least in part on receiving the third request message.

In Aspect 26, the method of any of Aspects 24, 25, and 26 may further include identifying a first portion of a second data section of the second slot allocated for data transmission by the third UE; and receiving the second sidelink message in a second portion of the second data section of the second slot based at least in part on receiving the third request message.

In Aspect 27, receiving the second sidelink message in the method of any of Aspects 16 through 26 may further include receiving at least one portion of the second sidelink message in a second portion of the second control section of the second slot that follows the portion of the second control section designated for scheduling ongoing transmissions.

In Aspect 28, the method of any of Aspects 16 through 27 may further include transmitting, to the second UE, a first response message in the first control section of the first slot, where receiving the first sidelink message in the first data section of the first slot is based at least in part on transmitting the first response message.

In Aspect 29, the method of any of Aspects 16 through 28 may further include transmitting, to the second UE, a second response message in the portion of the second control section of the second slot designated for scheduling ongoing transmissions, where receiving the second sidelink message is based at least in part on receiving the second response message.

In Aspect 30, the method of any of Aspects 16 through 29 may further include determining that a sidelink communication link of the sidelink network is not managed by a base station, where receiving the first request message, the second request message, or both, is based at least in part on determining that the sidelink communication link is not managed by the base station.

Aspect 31 is an apparatus for wireless communication at a first UE, including: a processor, memory coupled with the processor; and instructions stored in the memory and executable by the processor to cause the apparatus to: transmit, to a second UE, a first request message in a first control section of a first slot of a sidelink network, the first request message indicating a request to transmit a first sidelink message in a first data section of the first slot; transmit, to the second UE, the first sidelink message in the first data section of the first slot of the sidelink network based at least in part on transmitting the first request message; monitor a first portion of a second control section of a second slot of the sidelink network for one or more request messages or one or more response messages; transmit, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and transmit, to the second UE, the second sidelink message in the at least one portion of the second slot based at least in part on transmitting the second request message.

In Aspect 32, the apparatus of Aspect 31, the instructions to transmit the second sidelink message further are executable by the processor to cause the apparatus to: transmit, to the second UE, the second sidelink message in a second portion of the second control section of the second slot.

In Aspect 33, the apparatus of Aspect 32, the instructions to transmit the second sidelink message further are executable by the processor to cause the apparatus to: transmit a first portion of the second sidelink message in the second portion of the second control section of the second slot; and transmit a second portion of the second sidelink message in a second data section of the second slot.

In Aspect 34, the instructions apparatus of Aspects 31 through 33 are further executable by the processor to cause the apparatus to: receive, from a base station, a control message indicating that the first UE uses a first mode when communicating over the sidelink network, the first mode allowing one or more portions of the second control section of the second slot to be scheduled to communicate data, where transmitting the second request message is based at least in part on receiving the control message.

In Aspect 35, the instructions of apparatus of Aspect 34 are further executable by the processor to cause the apparatus to: determine a position of the portion of the second control section of the second slot designated for scheduling ongoing transmissions based at least in part on receiving the control message, where transmitting the second request message is based at least in part on determining the position.

In Aspect 36, the instructions of the apparatus of any of Aspects 31 through 35 are further executable by the processor to cause the apparatus to: receive, from a base station, a control message indicating a first size of the first portion of the second control section of the second slot and a second size of a second portion of the second control section of the second slot, the second portion of the second control section configured to be allocated to communicate data between the first UE and the second UE, where transmitting the second request message is based at least in part on receiving the control message indicating the first size and the second size.

In Aspect 37, the instructions of the apparatus of any of Aspects 31 through 36 are further executable by the processor to cause the apparatus to: identify an absence of a third request message in the first portion of the second control section of the second slot based at least in part on monitoring the first portion, where transmitting the second request message is based at least in part on identifying the absence of the third request message in the first portion.

In Aspect 38, the instructions of the apparatus of any of Aspects 31 through 36 are further executable by the processor to cause the apparatus to: receive, from a third UE, a third request message in the first portion of the second control section of the second slot based at least in part on monitoring the first portion.

In Aspect 39, the instructions to transmit the second sidelink message in the at least one portion of the second slot of the apparatus of Aspect 38 are executable by the processor to cause the apparatus to transmit the second sidelink message in a subset of the at least one portion of the second slot.

In Aspect 40, the instructions of the apparatus of Aspect 38 are further executable by the processor to cause the apparatus to: refrain from transmitting the second sidelink message in the at least one portion of the second slot based at least in part on receiving the third request message.

In Aspect 41, the instructions of apparatus of Aspect 38 are further executable by the processor to cause the apparatus to: identify a first portion of a second data section of the second slot allocated for data transmission by the third UE; and transmit the second sidelink message in a second portion of the second data section of the second slot based at least in part on receiving the third request message.

In Aspect 42, the instructions to transmit the second sidelink message in the apparatus of any of Aspects 31 through 41 are executable by the processor to cause the apparatus to: transmit at least one portion of the second sidelink message in a second portion of the second control section of the second slot that follows the portion of the second control section designated for scheduling ongoing transmissions.

In Aspect 43, the instructions of the apparatus of any of Aspects 31 through 42 are further executable by the processor to cause the apparatus to: receive, from the second UE, a first response message in the first control section of the first slot, where transmitting the first sidelink message in the first data section of the first slot is based at least in part on receiving the first response message.

In Aspect 44, the instructions of the apparatus of any of Aspects 31 through 43 are further executable by the processor to cause the apparatus to: receive, from the second UE, a second response message in the portion of the second control section of the second slot designated for scheduling ongoing transmissions, where transmitting the second sidelink message is based at least in part on receiving the second response message.

In Aspect 45, the instructions of the apparatus of any of Aspects 31 through 44 are further executable by the processor to cause the apparatus to: determine that a sidelink communication link of the sidelink network is not managed by a base station, where transmitting the first request message, the second request message, or both, is based at least in part on determining that the sidelink communication link is not managed by the base station.

Aspect 46 is an apparatus for wireless communication at a first UE, including: a processor, memory coupled with the processor; and instructions stored in the memory and executable by the processor to cause the apparatus to: receive, from a second UE, a first request message in a first control section of a first slot of a sidelink network, the first request message indicating a request for the second UE to transmit a first sidelink message in a first data section of the first slot; receive, from the second UE, the first sidelink message in the first data section of the first slot of the sidelink network based at least in part on receiving the first request message; monitor a first portion of a second control section of a second slot of the sidelink network for one or more request messages or one or more response messages; receive, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and receive, from the second UE, the second sidelink message in the at least one portion of the second slot based at least in part on receiving the second request message.

In Aspect 47, the instructions to receive the second sidelink message of the apparatus of Aspect 46 are executable by the processor to cause the apparatus to: receive, from the second UE, the second sidelink message in a second portion of the second control section of the second slot.

In Aspect 48, the instructions to receive the second sidelink message in the apparatus of Aspect 47 are further executable by the processor to cause the apparatus to: receive a first portion of the second sidelink message in the second portion of the second control section of the second slot; and receive a second portion of the second sidelink message in a second data section of the second slot.

In Aspect 49, the instructions of the apparatus of any of Aspects 46 through 48 are further executable by the processor to cause the apparatus to: receive, from a base station, a control message indicating that the first UE uses a first mode when communicating over the sidelink network, the first mode allowing one or more portions of the second control section of the second slot to be scheduled to communicate data, where receiving the second request message is based at least in part on receiving the control message.

In Aspect 50, the instructions of the apparatus of any of Aspects 46 through 49 are further executable by the processor to cause the apparatus to: determine a position of the portion of the second control section of the second slot designated for scheduling ongoing transmissions based at least in part on receiving the control message, where receiving the second request message is based at least in part on determining the position.

In Aspect 51, the instructions of the apparatus of any of Aspects 46 through 50 are further executable by the processor to cause the apparatus to: receive, from a base station, a control message indicating a first size of the first portion of the second control section of the second slot and a second size of a second portion of the second control section of the second slot, the second portion of the second control section configured to be allocated to communicate data between the first UE and the second UE, where receiving the second request message is based at least in part on receiving the control message indicating the first size and the second size.

In Aspect 52, the instructions of the apparatus of any of Aspects 46 through 51 are further executable by the processor to cause the apparatus to: identify an absence of a third request message in the first portion of the second control section of the second slot based at least in part on monitoring the first portion, where receiving the second request message is based at least in part on identifying the absence of the third request message in the first portion.

In Aspect 53, the instructions of the apparatus of any of Aspects 46 through 51 are further executable by the processor to cause the apparatus to: receive, from a third UE, a third request message in the first portion of the second control section of the second slot based at least in part on monitoring the first portion.

In Aspect 54, the instructions to receive the second sidelink message in the at least one portion of the second slot of the apparatus of Aspect 53 are executable by the processor to cause the apparatus to receive the second sidelink message in a subset of the at least one portion of the second slot.

In Aspect 55, the instructions of the apparatus of any of Aspects 53 and 54 are further executable by the processor to cause the apparatus to: transmit, to the second UE, a response message indicating for the second UE to refrain from transmitting the second sidelink message in the at least one portion of the second slot based at least in part on receiving the third request message.

In Aspect 56, the instructions of the apparatus of any of Aspects 53 through 56 are further executable by the processor to cause the apparatus to: identify a first portion of a second data section of the second slot allocated for data transmission by the third UE; and receive the second sidelink message in a second portion of the second data section of the second slot based at least in part on receiving the third request message.

In Aspect 57, the instructions to receive the second sidelink message of the apparatus of any of Aspects 46 through 56 are executable by the processor to cause the apparatus to: receive at least one portion of the second sidelink message in a second portion of the second control section of the second slot that follows the portion of the second control section designated for scheduling ongoing transmissions.

In Aspect 58, the instructions of the apparatus of any of Aspects 46 through 57 are further executable by the processor to cause the apparatus to: transmit, to the second UE, a first response message in the first control section of the first slot, where receiving the first sidelink message in the first data section of the first slot is based at least in part on transmitting the first response message.

In Aspect 59, the instructions of the apparatus of Aspects 46 through 58 are further executable by the processor to cause the apparatus to: transmit, to the second UE, a second response message in the portion of the second control section of the second slot designated for scheduling ongoing transmissions, where receiving the second sidelink message is based at least in part on receiving the second response message.

In Aspect 60, the instructions of the apparatus of any of Aspects 46 through 59 are further executable by the processor to cause the apparatus to: determine that a sidelink communication link of the sidelink network is not managed by a base station, where receiving the first request message, the second request message, or both, is based at least in part on determining that the sidelink communication link is not managed by the base station.

Aspect 61 is an apparatus for wireless communication at a first UE, including: means for transmitting, to a second UE, a first request message in a first control section of a first slot of a sidelink network, the first request message indicating a request to transmit a first sidelink message in a first data section of the first slot; means for transmitting, to the second UE, the first sidelink message in the first data section of the first slot of the sidelink network based at least in part on transmitting the first request message; means for monitoring a first portion of a second control section of a second slot of the sidelink network for one or more request messages or one or more response messages; means for transmitting, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and means for transmitting, to the second UE, the second sidelink message in the at least one portion of the second slot based at least in part on transmitting the second request message.

Aspect 62 is an apparatus for wireless communication at a first UE, including: means for receiving, from a second UE, a first request message in a first control section of a first slot of a sidelink network, the first request message indicating a request for the second UE to transmit a first sidelink message in a first data section of the first slot; means for receiving, from the second UE, the first sidelink message in the first data section of the first slot of the sidelink network based at least in part on receiving the first request message; means for monitoring a first portion of a second control section of a second slot of the sidelink network for one or more request messages or one or more response messages; means for receiving, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and means for receiving, from the second UE, the second sidelink message in the at least one portion of the second slot based at least in part on receiving the second request message.

Aspect 63 is a non-transitory computer-readable medium storing code for wireless communication at a first UE, the code including instructions executable by a processor to: transmit, to a second UE, a first request message in a first control section of a first slot of a sidelink network, the first request message indicating a request to transmit a first sidelink message in a first data section of the first slot; transmit, to the second UE, the first sidelink message in the first data section of the first slot of the sidelink network based at least in part on transmitting the first request message; monitor a first portion of a second control section of a second slot of the sidelink network for one or more request messages or one or more response messages; transmit, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and transmit, to the second UE, the second sidelink message in the at least one portion of the second slot based at least in part on transmitting the second request message.

Aspect 64 is a non-transitory computer-readable medium storing code for wireless communication at a first UE, the code including instructions executable by a processor to: receive, from a second UE, a first request message in a first control section of a first slot of a sidelink network, the first request message indicating a request for the second UE to transmit a first sidelink message in a first data section of the first slot; receive, from the second UE, the first sidelink message in the first data section of the first slot of the sidelink network based at least in part on receiving the first request message; monitor a first portion of a second control section of a second slot of the sidelink network for one or more request messages or one or more response messages; receive, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and receive, from the second UE, the second sidelink message in the at least one portion of the second slot based at least in part on receiving the second request message.

Aspects of these examples may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    transmitting, to a second UE, a first request message in a first control section of a first slot of a sidelink network, the first request message indicating a request to transmit a first sidelink message in a first data section of the first slot;
    transmitting, to the second UE, the first sidelink message in the first data section of the first slot of the sidelink network based at least in part on transmitting the first request message;
    monitoring a first portion of a second control section of a second slot of the sidelink network for one or more request messages or one or more response messages;

transmitting, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and transmitting, to the second UE, the second sidelink message in the at least one portion of the second slot based at least in part on transmitting the second request message.

2. The method of claim 1, wherein transmitting the second sidelink message further comprises:
transmitting, to the second UE, the second sidelink message in a second portion of the second control section of the second slot.

3. The method of claim 2, wherein transmitting the second sidelink message further comprises:
transmitting a first portion of the second sidelink message in the second portion of the second control section of the second slot; and
transmitting a second portion of the second sidelink message in a second data section of the second slot.

4. The method of claim 1, further comprising:
receiving, from a base station, a control message indicating that the first UE uses a first mode when communicating over the sidelink network, the first mode allowing one or more portions of the second control section of the second slot to be scheduled to communicate data, wherein transmitting the second request message is based at least in part on receiving the control message.

5. The method of claim 4, further comprising:
determining a position of the portion of the second control section of the second slot designated for scheduling ongoing transmissions based at least in part on receiving the control message, wherein transmitting the second request message is based at least in part on determining the position.

6. The method of claim 1, further comprising:
receiving, from a base station, a control message indicating a first size of the first portion of the second control section of the second slot and a second size of a second portion of the second control section of the second slot, the second portion of the second control section configured to be allocated to communicate data between the first UE and the second UE, wherein transmitting the second request message is based at least in part on receiving the control message indicating the first size and the second size.

7. The method of claim 1, further comprising:
identifying an absence of a third request message in the first portion of the second control section of the second slot based at least in part on monitoring the first portion, wherein transmitting the second request message is based at least in part on identifying the absence of the third request message in the first portion.

8. The method of claim 1, further comprising:
receiving, from a third UE, a third request message in the first portion of the second control section of the second slot based at least in part on monitoring the first portion.

9. The method of claim 8, wherein:
transmitting the second sidelink message in the at least one portion of the second slot comprises transmitting the second sidelink message in a subset of the at least one portion of the second slot.

10. The method of claim 8, further comprising:
refraining from transmitting the second sidelink message in the at least one portion of the second slot based at least in part on receiving the third request message.

11. The method of claim 8, further comprising:
identifying a first portion of a second data section of the second slot allocated for data transmission by the third UE; and
transmitting the second sidelink message in a second portion of the second data section of the second slot based at least in part on receiving the third request message.

12. The method of claim 1, wherein transmitting the second sidelink message further comprises:
transmitting at least one portion of the second sidelink message in a second portion of the second control section of the second slot that follows the portion of the second control section designated for scheduling ongoing transmissions.

13. The method of claim 1, further comprising:
receiving, from the second UE, a first response message in the first control section of the first slot, wherein transmitting the first sidelink message in the first data section of the first slot is based at least in part on receiving the first response message.

14. The method of claim 1, further comprising:
receiving, from the second UE, a second response message in the portion of the second control section of the second slot designated for scheduling ongoing transmissions, wherein transmitting the second sidelink message is based at least in part on receiving the second response message.

15. The method of claim 1, further comprising:
determining that a sidelink communication link of the sidelink network is not managed by a base station, wherein transmitting the first request message, the second request message, or both, is based at least in part on determining that the sidelink communication link is not managed by the base station.

16. A method for wireless communication at a first user equipment (UE), comprising:
receiving, from a second UE, a first request message in a first control section of a first slot of a sidelink network, the first request message indicating a request for the second UE to transmit a first sidelink message in a first data section of the first slot;
receiving, from the second UE, the first sidelink message in the first data section of the first slot of the sidelink network based at least in part on receiving the first request message;
monitoring a first portion of a second control section of a second slot of the sidelink network for one or more request messages or one or more response messages;
receiving, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and
receiving, from the second UE, the second sidelink message in the at least one portion of the second slot based at least in part on receiving the second request message.

17. The method of claim 16, wherein receiving the second sidelink message further comprises:

receiving, from the second UE, the second sidelink message in a second portion of the second control section of the second slot.

18. The method of claim 17, wherein receiving the second sidelink message further comprises:
receiving a first portion of the second sidelink message in the second portion of the second control section of the second slot; and
receiving a second portion of the second sidelink message in a second data section of the second slot.

19. The method of claim 16, further comprising:
receiving, from a base station, a control message indicating that the first UE uses a first mode when communicating over the sidelink network, the first mode allowing one or more portions of the second control section of the second slot to be scheduled to communicate data, wherein receiving the second request message is based at least in part on receiving the control message.

20. The method of claim 16, further comprising:
receiving, from a base station, a control message indicating a first size of the first portion of the second control section of the second slot and a second size of a second portion of the second control section of the second slot, the second portion of the second control section configured to be allocated to communicate data between the first UE and the second UE, wherein receiving the second request message is based at least in part on receiving the control message indicating the first size and the second size.

21. The method of claim 16, further comprising:
identifying an absence of a third request message in the first portion of the second control section of the second slot based at least in part on monitoring the first portion, wherein receiving the second request message is based at least in part on identifying the absence of the third request message in the first portion.

22. An apparatus for wireless communication at a first user equipment (UE), comprising:
a processor,
memory coupled with the processor; and
instructions stored in the memory and executable by the processor to cause the apparatus to:
transmit, to a second UE, a first request message in a first control section of a first slot of a sidelink network, the first request message indicating a request to transmit a first sidelink message in a first data section of the first slot;
transmit, to the second UE, the first sidelink message in the first data section of the first slot of the sidelink network based at least in part on transmitting the first request message;
monitor a first portion of a second control section of a second slot of the sidelink network for one or more request messages or one or more response messages;
transmit, to the second UE, a second request message in a portion of the second control section of the second slot designated for scheduling ongoing transmissions based at least in part on monitoring the first portion of the second control section, the second request message indicating a request to transmit a second sidelink message in at least one portion of the second slot of the sidelink network; and
transmit, to the second UE, the second sidelink message in the at least one portion of the second slot based at least in part on transmitting the second request message.

23. The apparatus of claim 22, wherein the instructions to transmit the second sidelink message further are executable by the processor to cause the apparatus to:
transmit, to the second UE, the second sidelink message in a second portion of the second control section of the second slot.

24. The apparatus of claim 23, wherein the instructions to transmit the second sidelink message further are executable by the processor to cause the apparatus to:
transmit a first portion of the second sidelink message in the second portion of the second control section of the second slot; and
transmit a second portion of the second sidelink message in a second data section of the second slot.

25. The apparatus of claim 22, wherein the instructions are further executable by the processor to cause the apparatus to:
receive, from a base station, a control message indicating that the first UE uses a first mode when communicating over the sidelink network, the first mode allowing one or more portions of the second control section of the second slot to be scheduled to communicate data, wherein transmitting the second request message is based at least in part on receiving the control message.

26. The apparatus of claim 25, wherein the instructions are further executable by the processor to cause the apparatus to:
determine a position of the portion of the second control section of the second slot designated for scheduling ongoing transmissions based at least in part on receiving the control message, wherein transmitting the second request message is based at least in part on determining the position.

27. The apparatus of claim 22, wherein the instructions are further executable by the processor to cause the apparatus to:
receive, from a base station, a control message indicating a first size of the first portion of the second control section of the second slot and a second size of a second portion of the second control section of the second slot, the second portion of the second control section configured to be allocated to communicate data between the first UE and the second UE, wherein transmitting the second request message is based at least in part on receiving the control message indicating the first size and the second size.

28. The apparatus of claim 22, wherein the instructions are further executable by the processor to cause the apparatus to:
identify an absence of a third request message in the first portion of the second control section of the second slot based at least in part on monitoring the first portion, wherein transmitting the second request message is based at least in part on identifying the absence of the third request message in the first portion.

29. An apparatus for wireless communication at a first user equipment (UE), comprising:
a processor,
memory coupled with the processor; and
instructions stored in the memory and executable by the processor to cause the apparatus to:
receive, from a second UE, a first request message in a first control section of a first slot of a sidelink network, the first request message indicating a request for the second UE to transmit a first sidelink message in a first data section of the first slot;

receive, from the second UE, the first sidelink message in the first data section of the first slot of the sidelink network based at least in part on receiving the first request message;

monitor a first portion of a second control section of a second slot of the sidelink network for one or more request messages or one or more response messages;

receive, from the second UE, a second request message in a portion of the second control section of the second slot designated for scheduling ongoing transmissions based at least in part on monitoring the first portion of the second control section, the second request message indicating a request for the second UE to transmit a second sidelink message in at least one portion of the second slot of the sidelink network; and receive, from the second UE, the second sidelink message in the at least one portion of the second slot based at least in part on receiving the second request message.

30. The apparatus of claim 29, wherein the instructions to receive the second sidelink message further are executable by the processor to cause the apparatus to:

receive, from the second UE, the second sidelink message in a second portion of the second control section of the second slot.

* * * * *